(12) United States Patent
Koyama et al.

(10) Patent No.: US 8,920,244 B2
(45) Date of Patent: Dec. 30, 2014

(54) INFORMATION PROCESSING APPARATUS AND INFORMATION PROCESSING SYSTEM

(71) Applicant: Sony Computer Entertainment Inc., Tokyo (JP)

(72) Inventors: Nobukazu Koyama, Tokyo (JP); Yasutaka Miwa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 119 days.

(21) Appl. No.: 13/682,044

(22) Filed: Nov. 20, 2012

(65) Prior Publication Data

US 2013/0079156 A1    Mar. 28, 2013

Related U.S. Application Data

(63) Continuation of application No. PCT/JP2011/001099, filed on Feb. 25, 2011.

(30) Foreign Application Priority Data

May 28, 2010  (JP) .................................. 2010-123126
May 28, 2010  (JP) .................................. 2010-123127

(51) Int. Cl.
  *G06F 17/00* (2006.01)
  *A63F 9/24* (2006.01)
  *A63F 13/30* (2014.01)

(52) U.S. Cl.
  CPC . *A63F 9/24* (2013.01); *A63F 13/12* (2013.01); *A63F 2300/575* (2013.01); *A63F 2300/609* (2013.01); *A63F 2300/513* (2013.01); *A63F 2300/61* (2013.01)
  USPC ............................................................ 463/43

(58) Field of Classification Search
  USPC ..................................................... 463/40–43
  See application file for complete search history.

(56) References Cited

U.S. PATENT DOCUMENTS

| | | | |
|---|---|---|---|
| 2007/0025694 A1* | 2/2007 | Takashima et al. | 386/95 |
| 2011/0092280 A1 | 4/2011 | Koyama et al. | |
| 2012/0218298 A1* | 8/2012 | Hayakawa | 345/633 |
| 2012/0233564 A1* | 9/2012 | Tsuchiya et al. | 715/772 |
| 2013/0325957 A1* | 12/2013 | Mizuki et al. | 709/204 |

FOREIGN PATENT DOCUMENTS

| | | |
|---|---|---|
| EP | 1949942 A1 | 7/2008 |
| EP | 2286882 A1 | 2/2011 |
| JP | 11207036 A | 8/1999 |

(Continued)

OTHER PUBLICATIONS

International Search Report for corresponding PCT Application PCT/JP2011/001099, dated May 24, 2011.

(Continued)

*Primary Examiner* — Ronald Laneau
(74) *Attorney, Agent, or Firm* — Matthew B. Dernier, Esq.; Gibson & Dernier LLP

(57) ABSTRACT

An application execution unit executes a game program. A play item acquisition processing unit generates item acquisition information by using an item ID associated with a met play requirement of a game, and a hard disk drive stores the generated item acquisition information. The play item acquisition processing unit refers to execution information stored in an execution information storing unit and generates an item acquisition table that maps an item ID to attribute information.

19 Claims, 15 Drawing Sheets

(56) References Cited

FOREIGN PATENT DOCUMENTS

| | | | |
|---|---|---|---|
| JP | 2000135372 | A | 5/2000 |
| JP | 2001187271 | A | 7/2001 |
| JP | 2007267858 | A | 10/2007 |
| JP | 2010005255 | A1 | 1/2010 |
| WO | 2009153910 | A1 | 12/2009 |

OTHER PUBLICATIONS

International Preliminary Report on Patentability and Written Opinion for corresponding PCT Application PCT/JP2011/001099, dated Dec. 4, 2012.

Office Action issued for corresponding Japanese Patent Application Nos. 2010-123126, dated Jul. 30, 2013.

Office Action issued for corresponding Japanese Patent Application Nos. 2010-123127, dated Jul. 30, 2013.

European Search Report for corresponding European Patent Application No. 11786246, dated Dec. 12, 2013.

Office Action for corresponding Japanese Patent Application No. 2013-239052, dated Oct. 28, 2014.

Guidebook of Chocobo's Mysterious Dungeon, Degicube Co., Ltd., first edition, 5 pages, Dec. 17, 1997 (for relevancy see JP Office Action dated Oct. 28, 2014 cited above).

* cited by examiner

FIG.5

| MISSIONS (GAME PLAY REQUIREMENTS) | ITEM ID |
|---|---|
| FINISH IN FIRST PLACE IN INTERNATIONAL GP | 1 |
| GET A BIG LEAD OVER SECOND PLACE | 2 |
| FINISH IN FIRST PLACE IN ALL TYPES OF VEHICLES | 3 |
| ⋮ | ⋮ |

FIG.6

| ITEM ID | ACQUISITION FLAG | ATTRIBUTE FLAG |
|---|---|---|
| 0 | 0 | 0 |
| 1 | 1 | 0 |
| 2 | 0 | 0 |
| 3 | 1 | 0 |
| ⋮ | ⋮ | ⋮ |

FIG.7
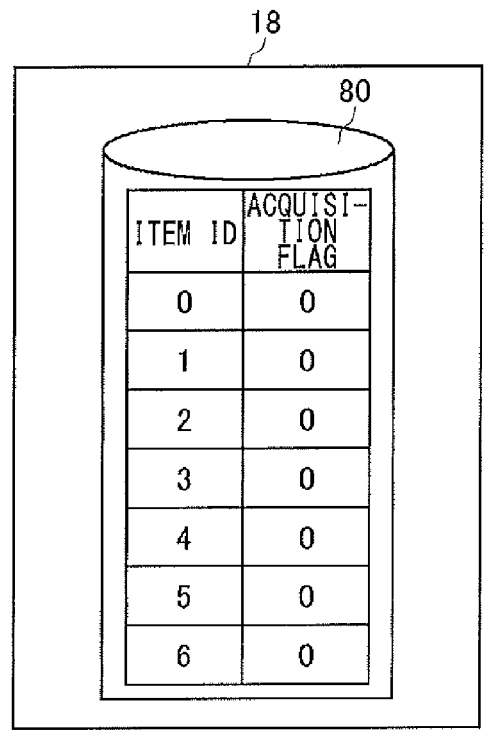
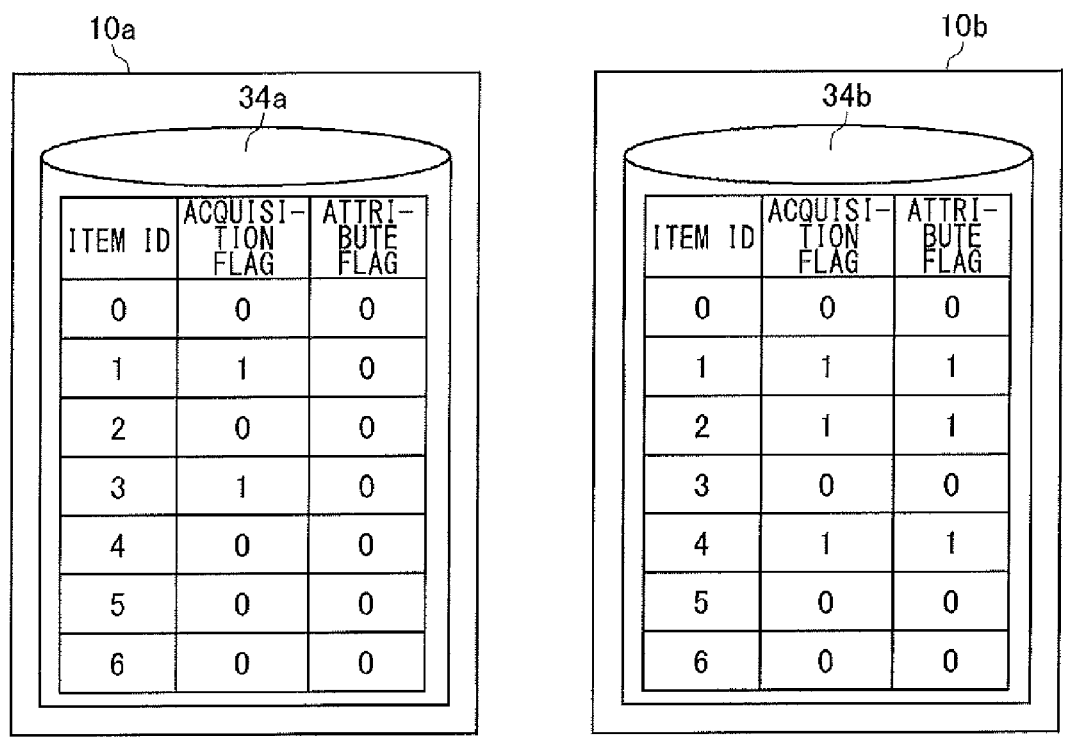

though the software is a trial version, it is preferred to be able to notify the user of the acquisition of the item. It is also preferred to present to the user at the same time that the acquisition did not occur in the product-version software. It is necessary to properly manage item acquisition information in order to achieve such a process.

INFORMATION PROCESSING APPARATUS AND INFORMATION PROCESSING SYSTEM

BACKGROUND OF THE INVENTION

1. Field of the Invention

The present invention relates to an application that allows a user to obtain an item and to a technology related thereto.

2. Description of the Related Art

In recent years, a wide variety of game software has been introduced. As one of measures for providing motivation for the user to continue to play, a possible option is to commend the degree of achievement when the user achieves various missions in a game. In this case, if it is possible to present the total degree of achievement for various games to the user and/or to allow the user to compete for the degree of achievement with another user instead of commending the achievement only in a closed world of a single game, the attractiveness of a game system will increase, and the user will be given meaning to play until the end. As such, achievement management systems are proposed that allows a user to acquire items when the user achieves missions and derive the level of the user based on points obtained according to acquisition of the items (Patent document No. 1).

[Patent document No. 1] Japanese Patent Application Publication No. 2010-5255

While various types of game software have been developed, game makers have been making efforts to introduce new games to users by distributing free trial-version software in addition to product advertisement by TV commercials and the like. In recent years, game devices have been introduced that allow game software to be stored in a large-capacity memory device such as a hard disk so as to enjoy installed games without a game disk. In such game devices, users can also download game software from a virtual game shop via the Internet. Thus, efforts have been also made toward acquisition of new users by distributing trial-version software from the virtual game shop.

In a system proposed in Patent document No. 1, a user may complete a mission and acquire an item when playing trial-version software. In this case, since the software is only trial-version software, it is not fair to users who have purchased product-version software to incorporate the acquired item in points that represent the level of a user. This is thus not preferred. However, since the acquired item is a result of game play even though the software is a trial version, it is preferred to be able to notify the user of the acquisition of the item. It is also preferred to present to the user at the same time that the acquisition did not occur in the product-version software. It is necessary to properly manage item acquisition information in order to achieve such a process.

SUMMARY OF THE INVENTION

The present invention provides a technology for properly managing item acquisition information.

An information processing apparatus according to one embodiment of the present invention includes: a storing unit configured to store execution information on an application program; a first item acquisition processing unit configured to generate, when a requirement is met that was set in advance in an application, item acquisition information using an item ID associated with the met requirement; and a memory device configured to store the generated item acquisition information. The first item acquisition processing unit determines attribute information on an acquired item based on the execution information stored in the storing unit and generates item acquisition information that maps an item ID to the determined attribute information.

Another embodiment of the present invention also relates to an information processing apparatus. The information processing apparatus includes: an item acquisition processing unit configured to generate, when a requirement is met that was set in advance in an application, item acquisition information using an item ID associated with the met requirement; a memory device configured to store the generated item acquisition information; and an acquired item displaying unit configured to display an image of the acquired item on a screen using the item acquisition information. The acquired item displaying unit displays an image of an item acquired when an application program was being executed under a predetermined environment in a mode different from that of an image of an item acquired when the application program was being executed under an environment different from the predetermined environment.

Another embodiment of the present invention relates to an information processing system. This information processing system relates to an information processing system where an information processing apparatus and a server are connected such that the information processing apparatus and the server can communicate through a network. The information processing apparatus includes: a first memory device configured to store item acquisition information that maps, to attribute information, an item ID for identifying an item acquired during the execution of an application program. The server includes: a second memory device configured to store, along with information identifying the user, item acquisition information including an item ID for identifying an item acquired by the user. The information processing apparatus determines whether or not to transmit the item acquisition information to the server based on the attribute information.

Another embodiment of the present invention relates to an information processing apparatus. This apparatus includes: an item acquisition processing unit configured to generate, when a requirement is met that was set in advance in an application, item acquisition information using an item ID associated with the met requirement; a memory device configured to store the generated item acquisition information; and a communication unit configured to transmit the item acquisition information stored in the memory device. The item acquisition processing unit generates item acquisition information that maps, to the item ID, attribute information determining whether or not to synchronize the item acquisition information stored in the memory device with that of another information processing apparatus, and the communication unit transmits item acquisition information including attribute information determining to perform synchronization but does not transmit item acquisition information including attribute information determining not to perform synchronization.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is a diagram illustrating an example of relationship between the content of a mission and an item ID;

FIG. 6 is a diagram illustrating a trophy acquisition table;

FIG. 7 is a diagram illustrating trophy acquisition tables in two game devices and an achievement-level management server;

DETAILED DESCRIPTION OF THE INVENTION

Figure 1:
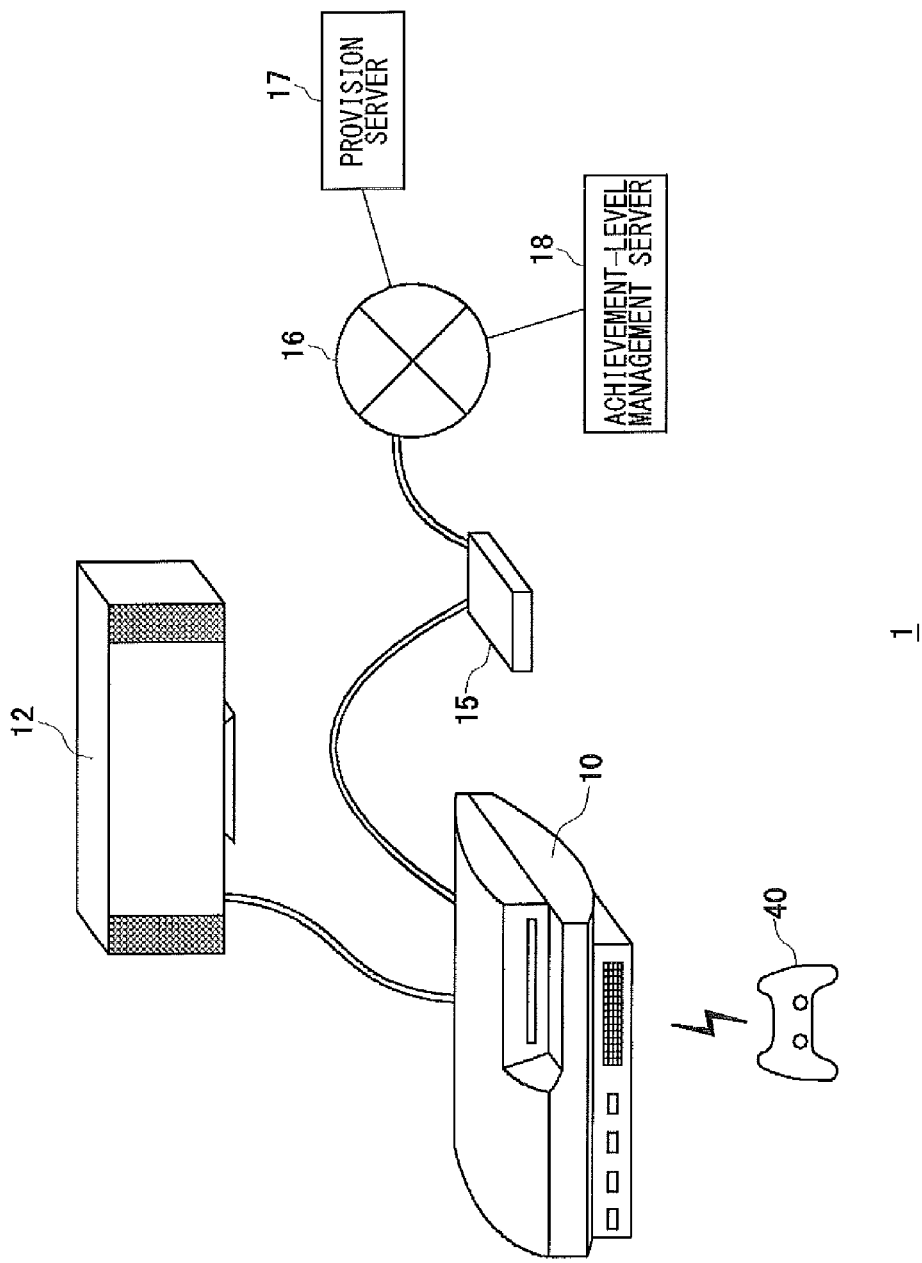
FIG. 1 is a diagram illustrating an information processing system according to an embodiment of the present invention.

The invention will now be described by reference to the preferred embodiments. This does not intend to limit the scope of the present invention, but to exemplify the invention.

An explanation is first given of the outline of the present invention. As an exemplary embodiment of the present invention, a game system is shown that is an example of an information processing system. In the game system, when the user clears, during game play, a requirement (mission) set in advance by game software, an item is provided by the game software according to the met requirement. A mission is appropriately set in the game software to be, e.g., winning a special race in a racing game and defeating a specific enemy character in a fighting game.

In the present exemplary embodiment, an item that is provided is referred to as a "trophy". There are several types of trophies. In the present exemplary embodiment, trophies are prepared in four grades (types): bronze; silver; gold; and platinum. The game software assigns missions to the three grades: bronze; silver; and gold, so that the degree of difficulty increases in said order. Therefore, a mission that can be easily achieved is assigned to a bronze trophy, and a mission that is difficult to achieve is assigned to a gold trophy. A platinum trophy does not correspond to an individual mission in a game. The system software provides a platinum trophy to the user when all the missions prepared by the game software are cleared.

The user can compare his/her acquired trophy with an acquired trophy of another user via an achievement-level management server on a network. The achievement-level management server manages an acquired trophy of the user. For example, in the case where game play is performed in a plurality of game devices by the user, trophies that are acquired in each game device are put together, and trophy acquisition information in each game device is then synchronized (file synchronization). Points have been set for each trophy type, and the user can raise his/her level as a game player by increasing the number of points that have been acquired.

File synchronization of trophy acquisition information occurs for a trophy acquired by the user using product-version game software. File synchronization does not occur for a trophy acquired using trial-version game software. In other words, in the information processing system according to the present exemplary embodiment, although the user can play a trial-version game and acquire a trophy, the trophy acquisition information is not synchronized with the achievement-level management server, in other words, the trophy acquisition information is not added as points. This ensures fairness to users who have purchased product-version software. Although a display mode of a trophy acquired by playing a trial-version game is different from that of a trophy acquired by playing a product-version game, a trophy acquired by playing a trial-version game is visibly displayed so that the user can confirm the acquisition of the trophy.

In addition to those legitimately purchased by the user, a product-version game software includes, e.g., those legitimately rented by the user on a temporary basis. On the other hand, for example, if game software that is the same as product-version game software is distributed as trial-version game software on a temporary basis of one day or so, this game software does not correspond to product-version game software according to the present exemplary embodiment. In other words, production-version game software means software for which the user is given legitimate authorization for executing the software in the present exemplary embodiment. In other words, whether or not game software is a product-version game software is determined by the presence of legitimate authorization. Therefore, game software rented by the user by paying a fee is also treated as a product-version game software. For example, in a case where a user downloads another user's save data so as to execute game software, the user does not have legitimate authorization for using the save data, and the game software is thus treated differently from a product-version game software in the present exemplary embodiment.

FIG. 1 illustrates an information processing system according to an exemplary embodiment of the present invention. An information processing system 1 is provided with a game controller 40, a game device 10 for executing a game program, and a display device 12 for outputting, in an image, a result of a process performed by the game device 10. The game device 10 may be a dedicated game device. Alternatively, the game device 10 may be a computer that installs an emulator and operates as a game device. The game controller 40 is an input interface apparatus that allows the user to enter operation input to the game device 10. The game controller 40 may serve to transmit operation input wirelessly. Alternatively, the game controller 40 may be connected to the game device 10 via a cable. The display device 12 may be a television set provided with a speaker. The display device 12 may be connected to the game device 10 via a wired cable or wirelessly via a wireless LAN (Local Area Network) or the like. The game device 10 is connected via a router 15 to a provision server 17 and an achievement-level management server 18 that are connected to a network 16 and is capable of transmitting and/or receiving desired data. The provision server 17 is operated by a game creator, a game sales company, or the like and provides to the game device 10 "rights" information and additional information regarding game software and the execution of the game software. A file that contains the "rights" information and additional information is referred to as a "rights" file. The achievement-level management server 18 is operated by a subject that manages a game achievement level and manages a trophy achieved by the user in a game.

The "rights" information provided from the provision server 17 contains key information for decoding encrypted game software. The additional information contains license information related to the execution of downloaded game software and contains, e.g., information specifying whether the game software is product-version game software or trial-version game software. If the game software is downloaded in a rental format, the additional information contains information indicating that the game software is rental-version software, information indicating the starting time and the ending time of the rental effective period, and the like. By acquiring the additional information, the game device 10 can recognize whether downloaded game software is product-version game software, trial-version game software, or rental content. In general, if the game software is trial-version game software, the execution of a game function is limited compared to that of the product-version game software. If the game software is rental-version game software, a function that is the same as that of the product-version game software is executed.

Upon recognition of being trial-version game software, the game software limits the function in accordance with a program that has been coded in advance. Whether or not the function is to be limited depends on the game software, and a functional limitation may not be imposed even if the game software is trial-version game software. For example, if the game software is trial-version software that allows for the execution of a function that is the same as that of product-version software for a limited time only, a playable period is written in the "rights" information, and information indicating that the game software is trial-version software is written in the additional information. This prevents the game software from being decoded after the expiration of the limited period, and the user can no longer play the game. If the game software is trial-version software that allows for the execution of the function without a time limitation while partially limiting the function of product-version software, a playable period is not written in the "rights" information, and information indicating that the game software is trial-version software is written in the additional information.

In the present exemplary embodiment, the provision server 17 provides, as trial-version game software, to the game device 10 without any charge product-version game software with an unlimited function and with a limited play period. When the game device 10 downloads trial-version game software from the provision server 17 according to an instruction from the user provided from the game controller 40, the user can play the downloaded game software as trial-version game software and purchase product-version game software by accessing the provision server 17 if the user is pleased with the game software.

In this case, the game device 10 only needs to acquire a "rights" file that contains "rights" information without a limited play period and additional information describing that the game software is product-version game software, instead of downloading the product-version game software. Upon the acquisition of the "rights" file, the game device 10 can treat the trial-version game software as the product-version game software. In other words, by acquiring the "rights" file of the product-version game software, the game device 10 can treat the downloaded game software as the product-version game software. For example, if a limitation of a play period, "available for only one day", is imposed on the trial-version game software, the game device 10 can execute the game software at any time by acquiring the "rights" file of the product-version game software so as to remove the limitation of the play period. If the downloaded game software is rental content, the user can play the game for one month by acquiring the "rights" file with additional information and a play period in which, e.g., one month extension period is described. In this case, when the rental period is expired after one month, for example, the game software may be automatically deleted from the game device 10 so that the user can no longer play.

As described, in the information processing system 1, it becomes unnecessary to download the product-version game software again by downloading the product-version game software as the trial-version game software after limiting the play period using the "rights" information. With this, the trouble of having to download the product-version game software can be avoided, and unnecessary storage of duplicate software of the same game in a memory device of the game device 10 can be also prevented. For example, by limiting the play period using the additional information and by allowing the product-version game software to be downloaded as rental-version game software, the user can be allowed to play the product-version game software within an effective period thereof.

In the information processing system 1, when the user clears, during game play, a requirement (mission) set in advance by game software, a trophy is provided according to the met requirement. The trophy acquisition information of the user is recorded in the memory device of the game device 10. If the game software is the product-version (or rental-version) game software, i.e., if the trophy is acquired by the user having legitimate authorization, the trophy acquisition information is transmitted to and accumulated in the achievement-level management server 18. The achievement-level management server 18 accumulates trophy acquisition information for each user based on an account ID on a network that identifies a user. For example, when a single user plays using a plurality of game devices 10, the achievement-level management server 18 merges new trophy acquisition information with trophy acquisition information that has been accumulated in the past and put the both sets of information together if the user uses the same account ID through the plurality of game devices 10. At the same time, the achievement-level management server 18 transmits merged trophy acquisition information to the plurality of game devices 10 of a single user, and trophy acquisition information is synchronized between the game devices 10 and the achievement-level management server 18.

Figure 2:
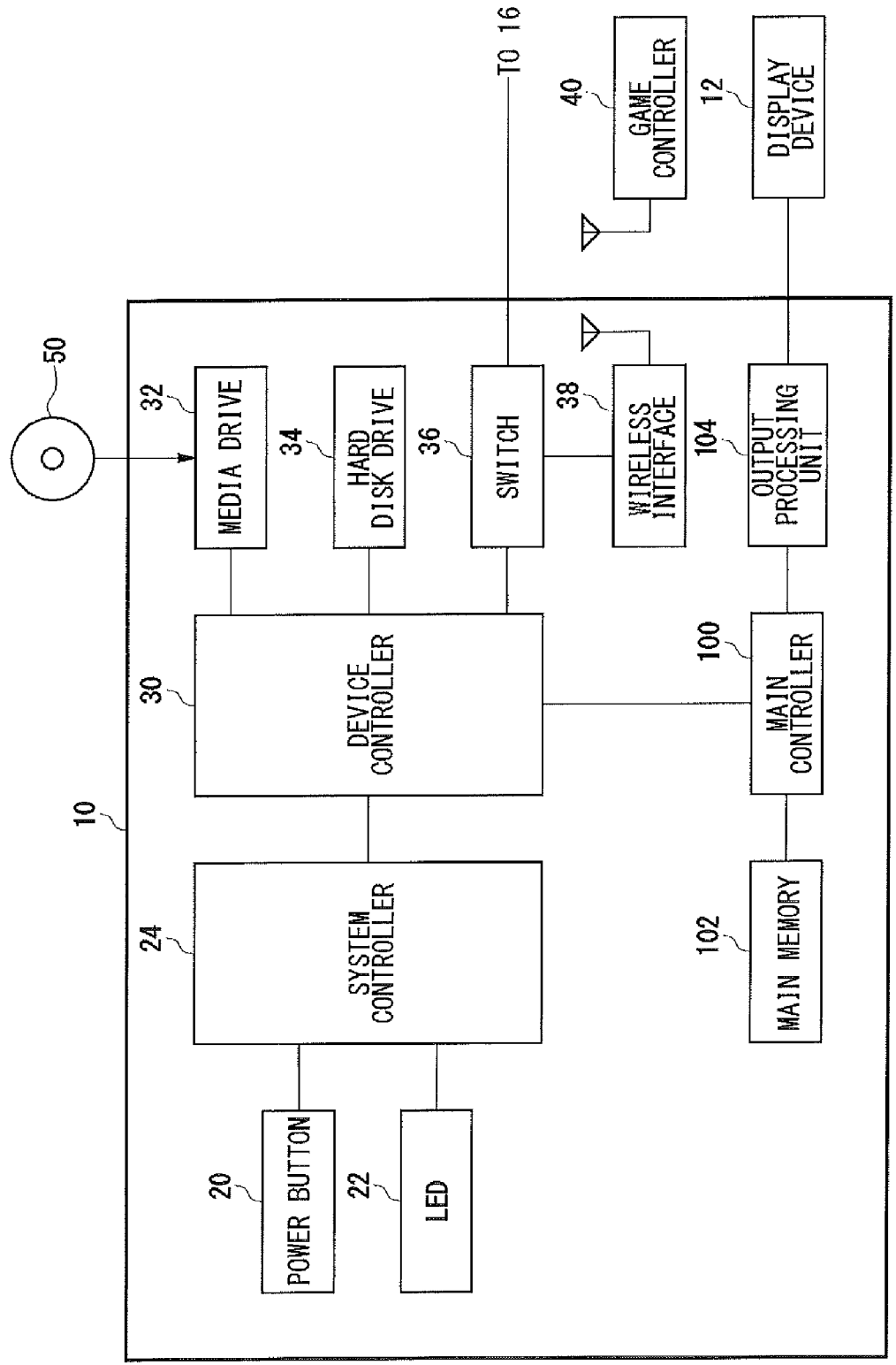
FIG. 2 is a diagram illustrating hardware blocks of a game device.

FIG. 2 illustrates a hardware block diagram of a game device 10. The game device 10 is provided with a power button 20, an LED 22, a system controller 24, a device controller 30, a media drive 32, a hard disk drive 34, a switch 36, a wireless interface 38, a main controller 100, main memory 102, and an output processing unit 104.

The power button 20 is an input unit to which operation input from the user is entered. The power button 20 is operated to turn on or off electrical supply to the game device 10.

The LED 22 displays the on or off state of the power by lighting. The system controller 24 detects a pressed-down state or a non-pressed-down state of the power button 20. Upon detection of state transition from a power-off state to the pressed-down state, the system controller 24 starts the main controller 100 so as to start up a boot sequence of an operating system and controls the lighting of the LED 22. If a power cable is plugged in the game device 10, the system controller 24 maintains a standby mode even during a power-off state and monitors for the pressing of the power button 20.

The device controller 30 is formed as an LSI (Large-Scale Integrated Circuit) for executing the exchange of information among devices just like a southbridge. As described in the figure, devices such as the system controller 24, the media drive 32, the hard disk drive 34, the switch 36, the main controller 100, and the like are connected to the device controller 30. The device controller 30 takes in differences in electrical properties and differences in data transmission speed of the devices and controls the timing of data transmission. The hard disk drive 34 drives a built-in hard disk and performs writing/reading of data. The built-in hard disk functions as a memory device for storing data. The media drive 32 is a drive apparatus that drives and recognizes, when a read-only recording medium 50 in which game software is recorded is mounted, the recording medium 50 so as to read necessary data from the recording medium 50. The recording medium 50 may be a medium such as an optical disk or a magneto-optical disk.

The switch 36 is an Ethernet switch (Ethernet is a registered trademark) and a device that is connected to an external device by wire or wirelessly so as to transmit and receive data. The switch 36 receives game software and a "rights" file from the provision server 17 via the network 16. The switch 36 transmits and/or receives desired data such as trophy acquisition information to/from the achievement-level management server 18. The switch 36 connects to the wireless interface 38, and the wireless interface 38 connects to the game controller 40 having a wireless communication function through a communication protocol such as a Bluetooth (registered trademark) protocol and an IEEE802.11 protocol. Operation information entered in the game controller 40 is provided to the main controller 100 via the wireless interface 38, the switch 36, and the device controller 30.

The main controller 100 is provided with a multi-core CPU and has one versatile processor core and a plurality of simple processor cores in one CPU. The versatile processor core is referred to as a PPU (Power Processing Unit), and the remaining processor cores are referred to as a SPU (Synergistic-Processing Unit). In the main controller 100, a function and an environment for efficiently using the game device 10 is provided, and an operating system (hereinafter, simply referred to as "OS (Operating System)") is executed that controls the entire device in an integrated manner. The OS of the game device 10 according to the present exemplary embodiment is provided with three layers, that is, a user layer, a kernel layer, and a hypervisor layer, in said order from the upper layer to the lower layer. Software of the user layer, the kernel layer, and the hypervisor layer integrally functions as the "OS" of the game device 10.

When the power is turned on using the power button 20, the system controller 24 provides power to the main controller 100 and the output processing unit 104 via the device controller 30. After power is provided to the main controller 100, the PPU first executes a boot loader of the OS so as to activate the hypervisor layer. The PPU then activates the kernel layer of the OS and further activates the user layer so as to prepare to receive data provided from the hard disk drive 34 or from the recording medium 50. This allows the main controller 100 to execute a game program.

The main controller 100 is provided with a memory controller connected to the main memory 102. The PPU has a register and is provided with a main processor as a main body for executing the calculation so as to efficiently assign a task serving as a basic processing unit in the application to execute to each SPU. The PPU may execute a task by itself. The SPU has a register and is provided with a sub-processor serving as a main body for executing the calculation and local memory serving as a local storage region. The main memory 102 and the local memory are configured as RAM (random access memory). The SPU has a DMA (Direct Memory Access) controller as a control unit for its exclusive use. By transmitting data between the main memory 102 and the local memory, the SPU can perform stream processing of data at a high speed and can implement high-speed data transmission between the frame memory built in the output processing unit 104 and the local memory.

The output processing unit 104 is connected to the display device 12 and outputs a video image signal and a sound signal that are the processing results of the application. The output processing unit 104 is provided with a GPU (Graphics Processing Unit) that implements an image processing function. The GPU adopts an HDMI (High Definition Multimedia Interface) and can output a video image signal in digital form.

The processing function of the game device 10 explained in the present exemplary embodiment can be applied to an information processing apparatus that executes not only games but also other applications. In the information processing apparatus, system software, application software, and an item management utility are executed. As an example of the information processing apparatus, an explanation is given of the processing function of the game device 10 that is implemented by system software, application software, and an item management utility.

Upon the detection of the achievement of a play requirement that is set in advance during the progress of the game by the user, the game software calls an item management utility installed in the game device 10 and gives the user an item (trophy).

More specifically, a trophy acquisition table is prepared beforehand in the hard disk drive 34, the trophy acquisition table indicating all trophy IDs prepared by the game software and acquisition flag values that show whether or not a trophy has been acquired. In the default state, the acquisition flag values are set to zero. When the game software provides the item management utility with a trophy ID that corresponds to the met requirement, the item management utility refers to the acquisition flag value of a corresponding trophy ID. The item management utility does not change the flag value if the flag value is one but sets the flag value to one if the flag value is zero. The trophy ID whose acquisition flag value is set to one constitutes trophy acquisition information. With this, every time the game software detects the achievement of a requirement that has been set, the trophy acquisition table is updated, increasing the trophy acquisition information.

The trophy acquisition table includes attribute information (attribute flag) that indicates whether or not the game software is being executed under a predetermined environment at the time of the acquisition of a trophy. Whether or not the game software is being executed under the predetermined environment is determined by, e.g., the additional information contained in the "rights" file. For example, when the additional information contains information indicating that the game software is product-version game software or rental-version game software, an attribute flag value is set to 1. On the other hand, when the additional information contains information indicating that the game software is trial-version game software, the attribute flag value is set to 0. Even when the additional information contains information indicating that the game software is product-version game software or rental-version game software, the attribute flag value of a trophy that is acquired is set to 0 if save data of another user other than the user himself/herself is being used. As will hereinafter be described, a second attribute flag may be provided, and the value thereof may be set to 0 in this case.

Even when the game software at the time of the acquisition of the trophy is trial-version game software where the attribute flag value is set to 0, the attribute flag value is changed to 1 when the user later acquires the "rights" file of the product-version game software so that the game software is upgraded to the product-version game software. With this, a trophy acquired in the trial-version game software is treated as a trophy acquired in the product-version game software after the acquisition of the "rights" file of the product-version game software and is to be merged in the acquisition information in the achievement-level management server 18. If the trophy is acquired using another user's save data, the trophy is not to be merged.

The item management utility transmits the trophy acquisition information to the achievement-level management server 18. The achievement-level management server 18 merges the new trophy acquisition information with the trophy acquisition information accumulated in the past, based on the user's account ID, and accumulates the information. This merging processing is performed not for each game but for each trophy. In other words, even if the game software being executed in the game device 10 is trial-version game software at the time of merging, an item is subject to the process of merging if there exists, among trophies acquired in the game, a trophy acquired during the play of the product-version game.

To the item management utility, the trophy acquisition information is transmitted from the achievement-level management server 18. For example, when the user performs game play using a plurality of game devices 10, trophy acquisition information acquired in one game device 10 is synchronized in other game devices 10. With this, even when the same game is played in a plurality of game devices 10, trophy acquisition information will be synchronized in the plurality of game devices 10 and in the achievement-level management server 18. Synchronization means keeping trophy acquisition information, which is to be stored, to be in the same state, for example, to be in the latest updated state in a plurality of information processing apparatuses. In the present exemplary embodiment, a combination of a trophy ID and an acquisition flag value needs to be synchronized, and an attribute flag value does not always need to be synchronized.

Figure 3:
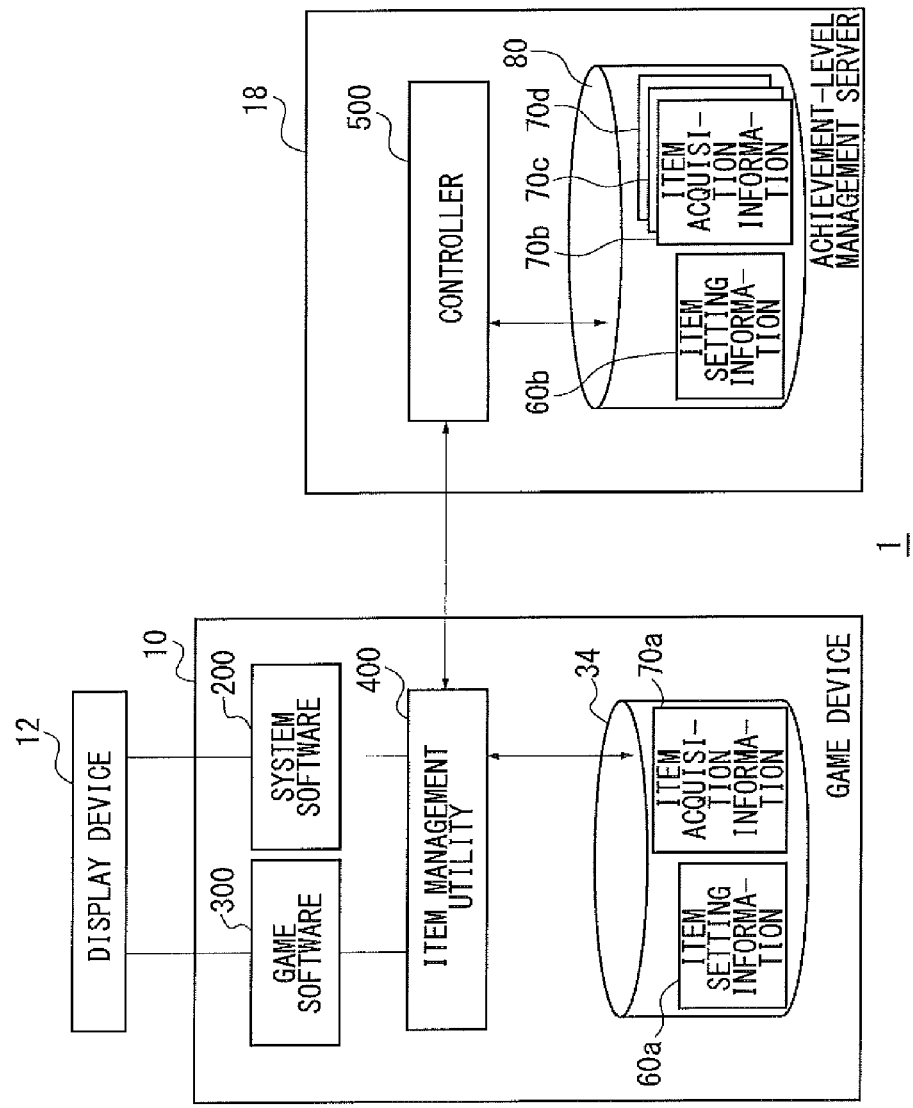
FIG. 3 is a diagram illustrating functional blocks of the information processing system for executing a process of managing an item.

FIG. 3 illustrates a functional block diagram of the information processing system 1 for executing a process of managing an item (trophy). The game device 10 executes system software 200, game software 300, and item management utility software (hereinafter referred to as an "item management utility") 400. The system software 200 is an operating system (OS) and has a display processing function or the like in the game device 10. The item management utility 400 provides a function for allowing the game software 300 to use the information processing system 1. The game software 300 executes, while utilizing a function of the item management utility 400, a process of installing item setting information 60a, a process of generating item acquisition information 70a, and a process of acquiring item setting information 60b and item acquisition information 70b from the achievement-level management server 18.

The achievement-level management server 18 is provided with a controller 500 and a memory device 80. In the memory device 80, the latest item setting information 60b and item acquisition information 70b, 70c, and 70d for a plurality of users who have registered with the information processing system 1 are retained. In the following, it is assumed that the item acquisition information 70b is the item acquisition information of a user of the game device 10 and that the item acquisition information 70c and the item acquisition information 70d are the item acquisition information of other users.

The game software 300 calls a "trophy registering function" from the item management utility 400 when the game software 300 is started. With this, item setting information 60 is fetched from a predetermined file included in game software recorded in the recording medium 50 or the hard disk drive 34 (the file is hereinafter referred to as an "item file"), and the fetched item setting information 60 is installed on the hard disk drive 34. This allows the game software 300 to be in a state where a trophy can be acquired. This installation process needs to be executed once. Thus, the installation process is executed at the time when the game software 300 is started for the first time.

If the user has signed in a service provided by the information processing system 1 at this time, the trophy registering function checks item acquisition information 70b associated with the account ID of the user in the achievement-level management server 18. If a trophy other than the trophy identified by the item acquisition information 70a stored in the hard disk drive 34 is included in the item acquisition information 70b in the achievement-level management server 18, the trophy registering function acquires the item acquisition information 70b and additionally stores the item acquisition information 70b in the hard disk drive 34. In this case, by allowing the trophy registering function to acquire a difference between the item acquisition information 70a and the item acquisition information 70b, the size of data to be transmitted can be reduced.

If a trophy other than the trophy identified by the item acquisition information 70b in the achievement-level management server 18 is included in the item acquisition information 70a, the trophy registering function transmits to the achievement-level management server 18 the item acquisition information 70a with an attribute flag value set to be 1, while the trophy registering function does not transmit to the achievement-level management server 18 the item acquisition information 70b with an attribute flag value set to be "0". By determining the item acquisition information 70a to be transmitted as described above, only the item acquisition information 70b acquired in product-version software is accumulated in the achievement-level management server 18.

If the item setting information 60b in the achievement-level management server 18 has been updated to be the latest item setting information 60b, the trophy registering function acquires the item setting information 60b and saves the item setting information 60b in the hard disk drive 34 while overwriting the old information.

Item setting information 60 includes attributes such as, an image representing each trophy (trophy image), the name and the explanation text for each trophy, or the like. The item setting information 60 may be updated so as to increase the number of trophies. Therefore, the trophy registering function of the item management utility 400 has a function of checking the achievement-level management server 18 for whether the item setting information 60 has been updated. The item setting information 60 is stored in one item file and included in game software stored in the recording medium 50 or the hard disk drive 34. One trophy has attributes shown as follows:
(1) Trophy ID
    An ID for identifying the trophy.
(2) Name/Detailed Information
    The name of the trophy and explanation regarding the trophy.
(3) Grade (Type)
    One of either bronze/silver/gold/platinum
(4) Platinum Link
    Whether the acquisition of the trophy is included in the requirement for acquiring a platinum trophy.
If a plurality of trophies are included in the item setting information 60, the number of a set of the attributes (1) through (4) indicated above and the number of trophy images that are set in the item setting information 60 are equal to be the number of the trophies.

The system software 200 generates a display screen image of the display device 12, for example, generates a screen image indicating the acquisition status of trophies, using a GUI (Graphical User Interface) and using the item setting information 60a and the item acquisition information 70a that are provided by the item management utility 400. In a trophy acquisition table, a trophy with an attribute flag value set to be 0 is displayed in a mode different from that of a trophy with an attribute flag value set to be 1. With this, it can be presented to the user that the trophy has been acquired using the trial-version software.

Figure 4:
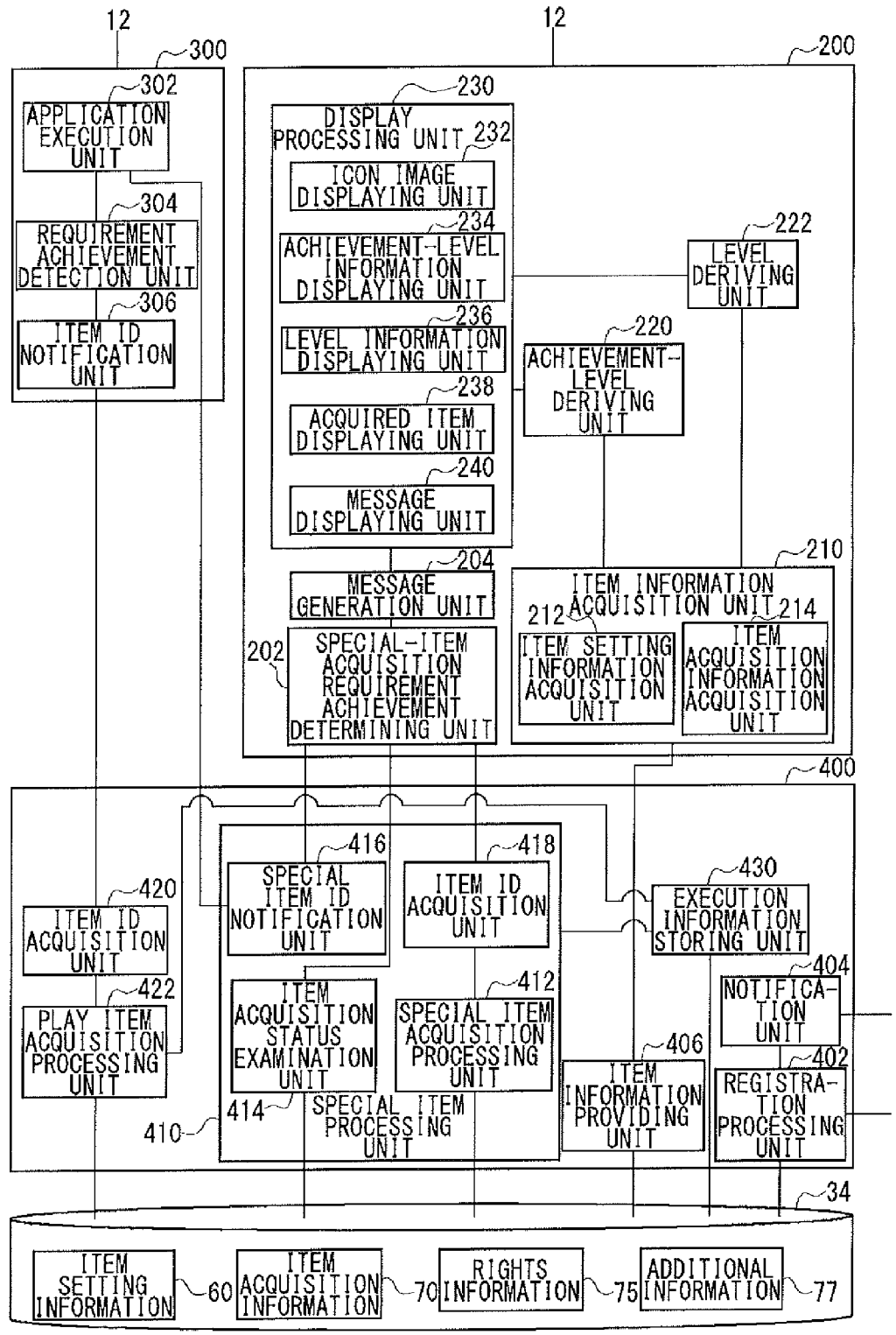
FIG. 4 is a diagram illustrating the detailed configuration of the game device.

A detailed explanation is given of the game device 10 in the following. FIG. 4 illustrates a detailed configuration of the game device 10 shown in FIG. 3. The game device 10 executes the system software 200, the game software 300, and the item management utility 400.

The system software 200 operates as an operating system (OS) and is provided with a special-item acquisition requirement achievement determining unit 202, a message generation unit 204, an item information acquisition unit 210, an achievement-level deriving unit 220, a level deriving unit 222, and a display processing unit 230. The item information acquisition unit 210 has an item setting information acquisition unit 212 and an item acquisition information acquisition unit 214. The display processing unit 230 has an icon image displaying unit 232, an achievement-level information displaying unit 234, a level information displaying unit 236, an acquired item displaying unit 238, and a message displaying unit 240.

The item management utility 400 is provided with a registration processing unit 402, a communication unit 404, an item information providing unit 406, a special item processing unit 410, an item ID acquisition unit 420, a play item acquisition processing unit 422, and an execution information storing unit 430. The special item processing unit 410 has a special item acquisition processing unit 412, an item acquisition status examination unit 414, a special item ID notification unit 416, and an item ID acquisition unit 418. The game software 300 is provided with an application execution unit 302, a requirement achievement detection unit 304, and an item ID notification unit 306.

In FIG. 4, the elements shown in functional blocks that indicate a variety of processes are implemented in hardware by any CPU (Central Processing Unit), memory, or other LSI's, and in software by a program loaded in memory, etc. As stated previously, the main controller 100 is provided with one PPU and a plurality of SPU's, and functional blocks can be formed by a PPU only, a SPU only, or the cooperation of both. Therefore, it will be obvious to those skilled in the art that the functional blocks may be implemented in a variety of manners by a combination of hardware and software.

The trophy registering function described above is performed by the registration processing unit 402. The registration processing unit 402 checks the item acquisition information 70b in the achievement-level management server 18 via the communication unit 404 at a predetermined point in time. If item acquisition information 70 of a trophy that is not retained in the hard disk drive 34 exists in the achievement-level management server 18 at this time, the registration processing unit 402 acquires the item acquisition information 70. If there is item acquisition information 70 of a trophy that is retained in the hard disk drive 34 but that is not retained in the achievement-level management server 18, the registration processing unit 402 transmits the item acquisition information 70 from the communication unit 404.

In reference to an attribute flag value, the registration processing unit 402 does not transmit item acquisition information 70 with an attribute flag value of "0" from the communication unit 404 but transmits only item acquisition information 70 with an attribute flag value of "1" from the communication unit 404 to the achievement-level management server 18. This allows the achievement-level management server 18 to acquire only item acquisition information 70 acquired using product-version game software. In other words, item acquisition information 70 acquired using product-version game software is synchronized between the game device 10 and the achievement-level management server 18 in the information processing system 1.

The game software 300 includes at least an execution program for executing a game, game data used by the execution program, and parameter information for defining setting information or the like related to the execution of the game. The execution program is a program used to progress the game. The game data includes data of stages developed in the game, character data, and the like. When combined, the execution program and the game data are sometimes called a game program.

The parameter information is data used to determine the operation of the game device 10, such as a rendering resolution of the game, age information regarding access restriction related to a parental lock function, and the like. The parameter information is read into the game device 10 before the execution program is started, and the parameter information is used for the setting of an output resolution, for the determination by the parental lock function of whether or not the execution program is to be executed, and the like.

Rights information 75 and additional information 77 of game software are registered in the hard disk drive 34. The rights information 75 includes key information for decoding the game software and includes, if the game software is trial-version game software with a limited play period, information regarding the limited play period. The additional information 77 includes information related to the game software and contains, e.g., information specifying whether the game software is product-version game software, trial-version game software, or rental-version game software.

When the user enters a request for executing a game by operating the game controller 40, the system software 200 checks the rights information 75 so as to determine whether the play period is limited. If the play period is limited and is already expired, the game program is not started. If the play period is not limited or if the play period is limited but not expired, the game program is decoded using the key information, and the application execution unit 302 starts the game program.

An explanation is first given of a process for acquiring a trophy and then given of a process for displaying the acquired trophy in the following.

<Process for Acquiring Trophies>

The registration processing unit 402 fetches the item setting information 60 from the item file included in the game software recorded in the recording medium 50 or the hard disk drive 34 and installs the fetched item setting information 60 on the hard disk drive 34. This allows the process for acquiring a trophy to be started.

Upon the receipt of operation input entered into the game controller 40 by the user, the application execution unit 302 executes the game program in the game software 300. In the exemplary embodiment, the game software 300 sets in advance a play requirement for acquiring a trophy. This requirement is referred to as a "mission", and the content of the mission may be open to the users or may remain unpublicized. Each mission is associated with the ID of a trophy (item ID) to be given to the user when the mission is accomplished.

Upon the detection of the achievement of the play requirement of the game that is set in advance during the progress of the game by the user, the game software 300 calls the item management utility 400 and notifies the item management utility 400 of the item ID. This process is coded in the game program. The content of each mission is associated, on a one-to-one basis, with the ID of the trophy (item ID) to be given to the user when the mission is accomplished. FIG. 5 illustrates an example of relationship between the content of a mission and an item ID.

The requirement achievement detection unit 304 detects, based on the status of the progress of the game, that the mission has been accomplished, i.e., that the play requirement of the game set in advance in the game has been met. This detection process is hard-coded in the game program, and a process for acquiring the item ID associated with the mission when the mission is accomplished is written in the game program. The detection of the accomplishment of the requirement corresponds to the acquisition of the item ID. The item ID notification unit 306 notifies the item management utility 400 of the acquired item ID.

In the item management utility 400, the item ID acquisition unit 420 acquires the item ID as notified and passes the item ID to the play item acquisition processing unit 422. The play item acquisition processing unit 422 generates item acquisition information 70 by using the item ID. The item acquisition information 70 is information indicating that an item has been acquired. The item acquisition information 70 includes an attribute flag value indicating whether or not a game program is being executed at the time of the acquisition of the item under a predetermined environment. The execution information storing unit 430 stores information included in the additional information 77 as execution information, and the play item acquisition processing unit 422 generates the item acquisition information 70 in reference to the execution information stored in the execution information storing unit 430 and stores the item acquisition information 70 in the hard disk drive 34. The execution information storing unit 430 stores execution information specifying whether the game software being executed is product-version game software, trial-version game software, or rental-version game software. The item acquisition information 70 is generated in the form of a table shown in the following.

FIG. 6 illustrates a trophy acquisition table. The trophy acquisition table records an item ID, an acquisition flag value indicating whether an item has been acquired, and an attribute flag value specifying the attribute information of an acquired item in association with one another. An acquisition flag value of "0" indicates that a corresponding item has not been acquired, and an acquisition flag value of "1" indicates that a corresponding item has been acquired.

An attribute flag is information indicating whether or not an acquired item was acquired at the time when a game program was being executed under a predetermined environment. The predetermined environment means an environment where the user has legitimate authorization for executing the game program. More specifically, the predetermined environment is an environment where a product-version or rental-version game program is being executed and/or an environment where the user has a proper user account ID. If an item is acquired when a game program is being executed in this environment, an attribute flag value is set to one. On the other hand, if an item is acquired when a trial-version game program is being executed or when the user is playing with an account ID for a guest, an attribute flag value is set to zero.

An attribute flag value is used for a process related to an acquired item and a process related to an image of the acquired item. As the process related to an acquired item, the attribute flag value is treated as information determining whether or not to synchronize the item acquisition information 70 with that of another information processing apparatus such as the achievement-level management server 18. As the process of an image of the acquired item, the attribute flag value is treated as information determining whether to display an item image in a standard mode or to display the item image in a mode different from a standard mode. The standard display mode is a display mode of an item image acquired in a product-version game program.

When a mission is accomplished, the acquisition flag value of an item ID corresponding to the mission is set to "1". More specifically, upon the receipt of the item ID from the item ID acquisition unit 420, the play item acquisition processing unit 422 checks whether the acquisition flag value associated with the item ID is "1". The play item acquisition processing unit 422 does not change the acquisition flag value if the acquisition flag value is "1", and sets the acquisition flag value to be "1" if the acquisition flag value is "0". In this case, the play item acquisition processing unit 422 refers to the execution information stored in the execution information storing unit 430. The execution information storing unit 430 may be a cache storing additional information 77 read from the hard disk drive 34. The play item acquisition processing unit 422 may refer to the additional information 77 stored in the hard disk drive 34. In this case, the hard disk drive 34 functions as a storing unit that stores the additional information 77, which is execution information.

If the play item acquisition processing unit 422 recognizes in reference to the execution information that the game program is being executed under an environment different from the predetermined environment, the play item acquisition processing unit 422 sets an attribute flag value to be associated to an item ID to be zero. On the other hand, if the play item acquisition processing unit 422 recognizes based on the execution information that the game program is being executed under the predetermined environment, the play item acquisition processing unit 422 sets the attribute flag value to be one. An example shown in FIG. 6 shows a state where the respective attribute flag values of an item ID "1" and an item ID "3" are set to zero since game software used at the time the respective items are acquires is trial-version game software. As described above, item acquisition information 70 stored in the hard disk drive 34 is information that associates an item ID, an acquisition flag value, and an attribute flag value with one another.

Upon the receipt of an item ID from the item ID acquisition unit 420, the play item acquisition processing unit 422 refers to the execution information stored in the execution information storing unit 430 and determines an attribution flag value each time. Therefore, every time a requirement is met in a game, the play item acquisition processing unit 422 refers to the execution information stored in the execution information storing unit 430, determines the attribution flag value of an acquired item, and generates item acquisition information 70.

The game device 10 according to the present exemplary embodiment has a mechanism that allows a "rights" file of product-version game software to be purchased during game play of the user using trial-version game software. The game device 10 transmits to the provision server 17 a request for acquiring a "rights" file that is entered through the game controller 40. The request for acquiring includes identification information identifying game software. Upon the receipt of the request for acquiring a "rights" file, the provision server 17 generates configuration data of a game purchase screen image based on the identification information of the game software and transmits the configuration data to the game device 10. The game device 10 displays a purchase screen image on the display device 12. When the user performs an operation for selecting a purchase button provided in the purchase screen image, a purchase request including the identification information of the game software is transmitted to the provision server 17. In response to this, the provision server 17 charges the user and transmits as a reply the "rights" file of the product-version game software. Based on the identification information, the registration processing unit 402 generates a directory in the hard disk drive 34 and stores the received "rights" file in the directory. As described previously, the additional information 77 of the "rights" file stored in the hard disk drive 34 is read out by the execution information storing unit 430.

As described, even when game software is trial-version game software at the time of starting the play, the game software can be changed to product-version game software during the play in the information processing system 1. Therefore, every time a play requirement is met, the play item acquisition processing unit 422 refers to the execution information in the execution information storing unit 430 and checks whether a game program being executed is a product-version game program, a trial-version game program, or a rental-version game program. The play item acquisition processing unit 422 refers to the execution information in the execution information storing unit 430, sets an attribution flag value, and generates item acquisition information 70. The generated item acquisition information 70 is stored in the hard disk drive 34.

If the execution information stored in the execution information storing unit 430 indicates that the game program is being executed under the predetermined environment, the play item acquisition processing unit 422 changes information that is included in the item acquisition information 70, which has already been generated for the same game, and that indicates that an item was acquired by the user during the execution of the game program under an environment different from the predetermined environment to information that indicates that an item was acquired by the user during the execution of the game program under the predetermined environment. In other words, if the execution information stored in the execution information storing unit 430 indicates that the game program is a product-version game program or a rental-version game program, the play item acquisition processing unit 422 sets all attribution flag values for which respective acquisition flag values are set to be "1" in a trophy acquisition table in the game to be "1". In other words, the play item acquisition processing unit 422 changes an attribute flag value of "0" to an attribute flag value of "1" so as to change a trophy acquired in the trial-version game program to a trophy acquired in the product-version game program. As described, if the user purchases a "rights" file of a product-version game program, a trophy acquired in a trial-version game program is treated as a trophy acquired in a product-version game program. With this, benefits can be offered for becoming a user of the product-version game program.

Items on which the play item acquisition processing unit 422 performs an acquisition process are trophies of three types: bronze; silver; and gold. A platinum trophy is not included. The item ID of a platinum trophy is "0". The value "1" or greater is assigned to the item ID of the bronze, the silver, or the gold. The game software 300 can give the user three types of trophies: the bronze; the silver; and the gold, as described. On the other hand, a platinum trophy is given to the user by the system software 200.

Once the play item acquisition processing unit 422 performs the process of acquiring an item, the special-item acquisition requirement achievement determining unit 202 allows the item acquisition status examination unit 414 to examine the acquisition status of items. The item acquisition status examination unit 414 refers to the item setting information 60 and the item acquisition information 70 so as to examine the acquisition status of items and then notifies the special-item acquisition requirement achievement determining unit 202 of the acquisition status. Based on a examination result from the item acquisition status examination unit 414, the special-item acquisition requirement achievement determining unit 202 determines whether or not an item acquisition requirement for acquiring a special item has been met. In general, this item acquisition requirement is set to acquire a plurality of items (trophies).

As described previously, information on the "platinum link" is set as an attribute for a trophy. The information on the platinum link is set as a flag value. A flag value "1" means that the acquisition of the trophy is included in the requirement for acquiring a platinum trophy. A flag value 0 means that the acquisition of the trophy is not included in the requirement for acquiring a platinum trophy. The item setting information 60 is updated when an item is added. In the default item setting information 60, the respective flag values of the platinum links for all the items may be set to "1", and the respective flag values for additional items may be set to "0".

The item acquisition status examination unit 414 refers to the item setting information 60 and extracts an item ID for which the flag value of the platinum link (the flag value is hereinafter referred to as a platinum flag value) is set to "1". Then, the item acquisition status examination unit 414 refers to the trophy acquisition table and examines whether the respective acquisition flag values of all the extracted item IDs are "1".

If there is an item whose platinum flag value is "1" that has not been acquired, the item acquisition status examination unit 414 notifies the special-item acquisition requirement achievement determining unit 202 of the examination result. Upon the receipt of the notification, the special-item acquisition requirement achievement determining unit 202 determines that the item acquisition requirement for acquiring a special item, i.e., a platinum trophy, has not been met.

On the other hand, if all the items for which the platinum link is set have been acquired, the item acquisition status examination unit 414 refers to the trophy acquisition table and examines whether the respective attribute flag values of all the acquired items are "1". If the respective attribute flag values of all the items for which the platinum link is set are "1", the item acquisition status examination unit 414 notifies the special-item acquisition requirement achievement determining unit 202 of the examination result, and the special-item acquisition requirement achievement determining unit 202 determines that the item acquisition requirement has been met in the product-version game software or the rental-version game software. On the other hand, if there is even one acquired item having an attribute flag value of "0" among all the acquired items for which the platinum link is set, the item acquisition status examination unit 414 notifies the special-item acquisition requirement achievement determining unit 202 of the examination result, and the special-item acquisition requirement achievement determining unit 202 determines that the item acquisition requirement has been met in the trial-version game software.

The special-item acquisition requirement achievement determining unit 202 may have an examination function performed by the item acquisition status examination unit 414. In this case, the special-item acquisition requirement achievement determining unit 202 is provided with both the item setting information 60 and the item acquisition information 70 from the item information providing unit 406 and examines the acquisition status of items.

If the requirement for acquiring a platinum trophy is met, the special-item acquisition requirement achievement determining unit 202 notifies the item ID acquisition unit 418 of the item ID of the platinum trophy along with the attribute flag value. The item ID value for this is "0". The attribute flag value is "1" if the item acquisition requirement is met in the product-version game software or in the rental-version game software, and the attribute flag value is "0" if the item acquisition requirement is met in the trial-version game software. The item ID acquisition unit 418 acquires the item ID as notified and the attribute flag value, and passes the item ID and the attribute flag value to the special item acquisition processing unit 412. The special item acquisition processing unit 412 uses the item ID so as to generate item acquisition information 70. More specifically, the special item acquisition processing unit 412 sets the acquisition flag value of an item of an item ID 0 to be "1" in the trophy acquisition table and sets the attribute flag value to be the conveyed value.

In this case, the special-item acquisition requirement achievement determining unit 202 instructs the special item ID notification unit 416 to notify the game software 300 of the item ID 0. The special item ID notification unit 416 notifies the game software 300 of the item ID 0 for a platinum trophy. Upon the receipt of the notification, the application execution unit 302 may display on the game screen a message indicating that a platinum trophy is acquired.

Alternatively, this message may be displayed on the game screen by the system software 200. If the requirement for acquiring a platinum trophy is met, the message generation unit 204 receives an instruction from the special-item acquisition requirement achievement determining unit 202 and generates a message relating to the acquisition of a platinum trophy. The message generation unit 204 may generate a message in accordance with the attribute flag value. For example, if the attribute flag value is "0", i.e., if a platinum trophy is acquired in a trial-version game, a message, "Congratulations on Acquiring Platinum Trophy (This is a trial-version game, and this acquisition is thus not counted for points in the achievement-level management server.)" is generated. The message displaying unit 240 displays the generated message such that the message is superimposed on a predetermined area of a screen image of the game being played. With this, even when the game software 300 does not display a message regarding the acquisition of the platinum trophy, the system software 200 displays the message over the game screen so that the user can have an opportunity to view the message.

As described above, in the game device 10, the game software 300 grants the user a bronze, silver, or gold trophy as a result of accomplishing a mission of the game, and the system software 200 grants the user a platinum trophy as a result of the acquisition of bronze, silver, and/or gold trophies by the user. This adds a sense of "premium" feeling to a platinum trophy. By allowing the system software 200 to perform the process of acquiring a platinum trophy, a burden for processing that is imposed on the game software 300 can be lightened, and a burden for developing games that is imposed on the game developers can also be lightened.

In the information processing system 1 according to the present exemplary embodiment, if the user officially purchases a "rights file" of product-version game software after the user executes the game using trial-version game software and acquires a trophy, the attribute flag value is updated to one in the trophy acquisition table. Therefore, in many cases, the respective attribute flag values of acquired trophies usually have the same value of either "0" or "1", and an attribute flag value of "0" and an attribute flag value of "1" are hardly mixed in a trophy acquisition table.

For example, if the user borrows a recording medium 50 of game software from his/her friend and inserts the recording medium 50 into the media drive 32 so as to play the game, the attribute flag of an acquired trophy is set to be 1. However, there can be a case where the user then returns the recording medium 50 to the friend and downloads trial-version game software from the provision server 17 so as to play the game. In this case, the attribute flag of a trophy acquired in the trial-version game software is set to "0". In such a case, an attribute flag value of "0" and an attribute flag value of "1" can be mixed in one trophy acquisition table of the game.

In a case where the user plays the game at a plurality of sites, e.g., in a case where the user plays the trial-version game software in a first game device 10a and plays the product-version game software in a second game device 10b, an attribute flag value of "0" and an attribute flag value of "1" can be also mixed in one trophy acquisition table of the game in the first game device 10a executing the trial-version game software. In the following, an explanation is given of a process of synchronizing item acquisition information 70 among the two game devices 10a and 10b and the achievement-level management server 18.

FIG. 7 illustrates trophy acquisition tables in the two game devices 10a and 10b and the achievement-level management server 18. A trophy acquisition table is stored each in a hard disk drive 34a of the game device 10a and a hard disk drive 34b of the game device 10b. It is assumed that item acquisition information is generated by executing a trial-version game program in the game device 10a and by executing a product-version game program in the game device 10b. In an example shown in FIG. 7, the achievement-level management server 18 is not connected to the game device 10a or to the game device 10b, and the item acquisition information is not synchronized in the memory device 80 of the achievement-level management server 18.

Figure 8:
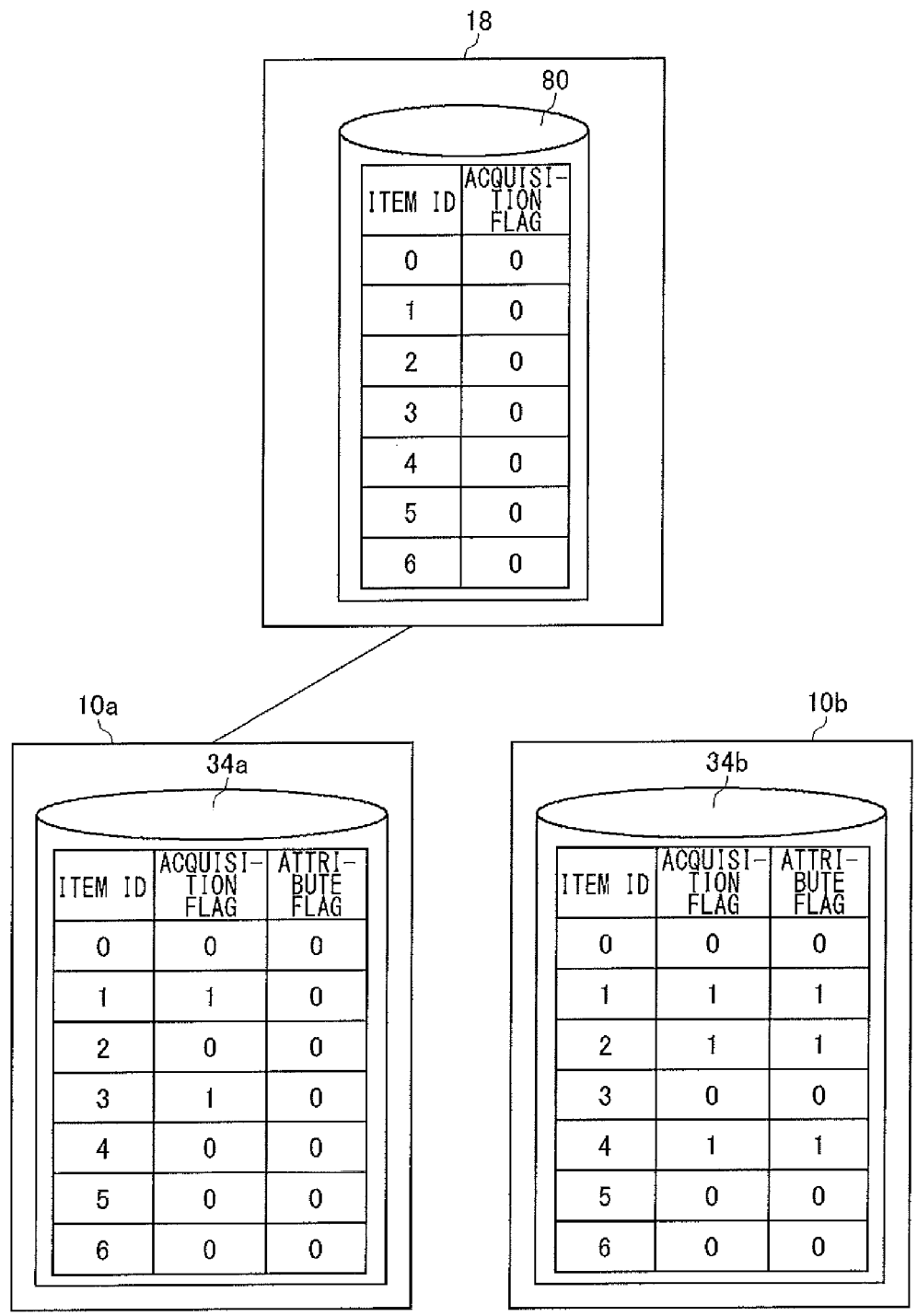
FIG. 8 is a diagram illustrating a situation where a process of synchronizing item acquisition information is performed between a first game device and the achievement-level management server.

FIG. 8 illustrates a situation where the game device 10a and the achievement-level management server 18 are connected and where a process of synchronizing item acquisition information is performed between the game device 10a and the achievement-level management server 18. In the game device 10a, the registration processing unit 402 checks the item acquisition information in the achievement-level management server 18 via the communication unit 404. If the item acquisition information of a trophy that is not retained in the hard disk drive 34*a* exists in the achievement-level management server 18, the registration processing unit 402 acquires the item acquisition information. In this case, the registration processing unit 402 does not acquire the item acquisition information since the item acquisition information does not exist in the achievement-level management server 18. If there is item acquisition information of a trophy that is retained in the hard disk drive 34*a* but that is not retained in the achievement-level management server 18, the registration processing unit 402 transmits the item acquisition information from the communication unit 404. The registration processing unit 402 determines whether or not to transmit the item acquisition information based on an attribute flag value at this time. More specifically, in reference to an attribute flag value, the registration processing unit 402 determines to transmit item acquisition information with an attribute flag value of "1" but not to transmit item acquisition information with an attribute flag value of "0". Since only item acquisition information with an attribute flag value of "0" exists in the hard disk drive 34*a*, item acquisition information is not transmitted from the communication unit 404.

Figure 9:
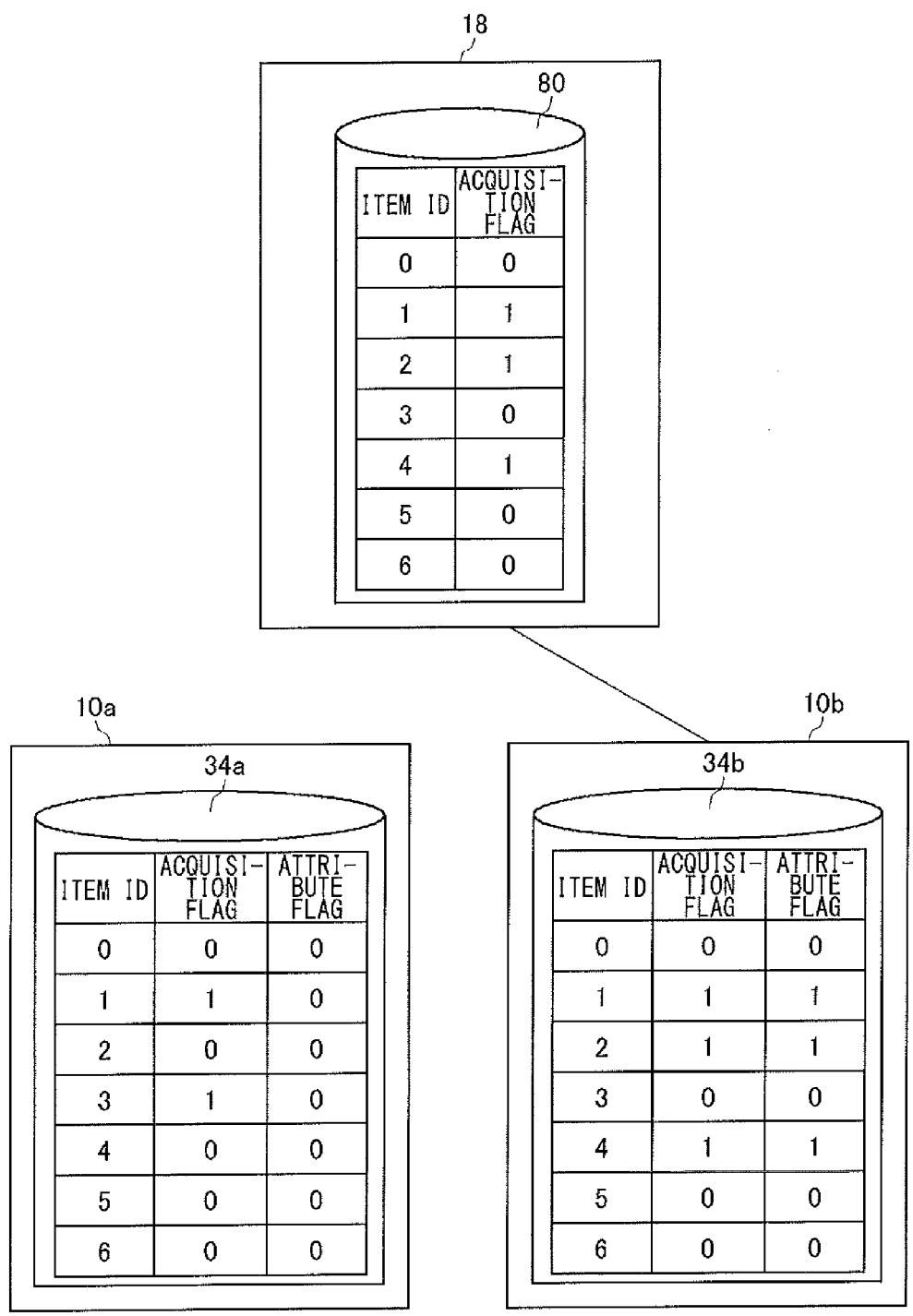
FIG. 9 is a diagram illustrating a situation where a process of synchronizing item acquisition information is performed between a second game device and the achievement-level management server.

FIG. 9 illustrates a situation where the game device 10*b* and the achievement-level management server 18 are connected after the connection between the game device 10*a* and the achievement-level management server 18 in the situation shown in FIG. 8 is disconnected so that the process of synchronizing item acquisition information is performed between the game device 10*b* and the achievement-level management server 18. In the game device 10*b*, the registration processing unit 402 checks the item acquisition information in the achievement-level management server 18 via the communication unit 404. If the item acquisition information of a trophy that is not retained in the hard disk drive 34*b* exists in the achievement-level management server 18, the registration processing unit 402 acquires the item acquisition information. In this case, the registration processing unit 402 does not acquire the item acquisition information since the item acquisition information does not exist in the achievement-level management server 18. If there is item acquisition information of a trophy that is retained in the hard disk drive 34*b* but that is not retained in the achievement-level management server 18, the registration processing unit 402 transmits the item acquisition information from the communication unit 404. At this time, in reference to an attribute flag value, the registration processing unit 402 does not transmit item acquisition information with an attribute flag value of "0" from the communication unit 404 but transmits item acquisition information with an attribute flag value of "1" from the communication unit 404. The registration processing unit 402 reads respective sets of item acquisition information of item IDs 1, 2, and 4 from the hard disk drive 34*b* and transmits the item acquisition information to the achievement-level management server 18 from the communication unit 404. In this manner, the achievement-level management server 18 records the respective sets of item acquisition information of the item IDs 1, 2, and 4 in the memory device 80.

Figure 10:
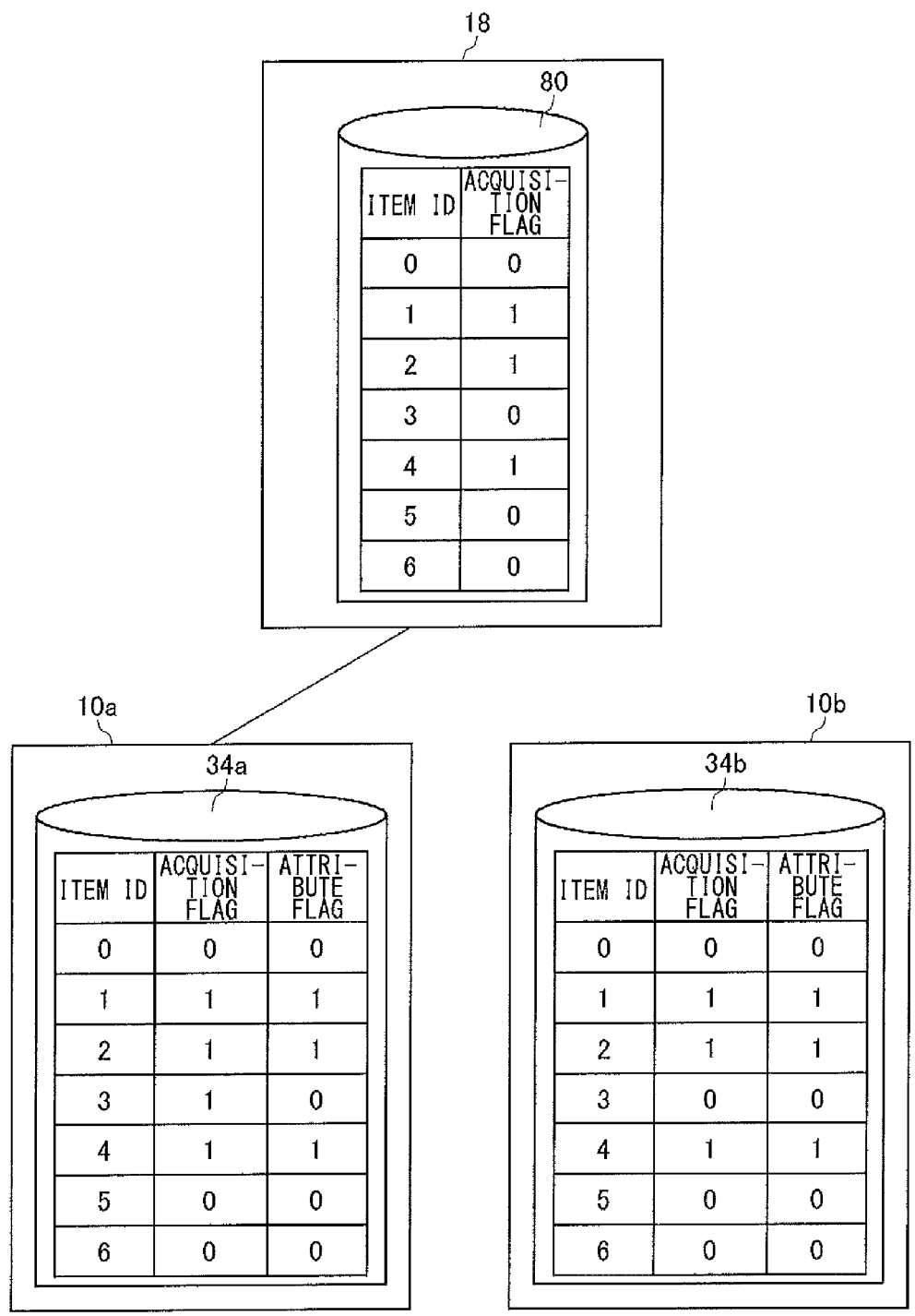
FIG. 10 is a diagram illustrating a situation where a process of synchronizing item acquisition information is performed between the first game device and the achievement-level management server.

FIG. 10 illustrates a situation where the game device 10*a* and the achievement-level management server 18 are connected after the connection between the game device 10*b* and the achievement-level management server 18 in the situation shown in FIG. 9 is disconnected so that the process of synchronizing item acquisition information is performed between the game device 10*a* and the achievement-level management server 18. In the game device 10*a*, the registration processing unit 402 checks the item acquisition information in the achievement-level management server 18 via the communication unit 404. If the item acquisition information of a trophy that is not retained in the hard disk drive 34*a* exists in the achievement-level management server 18, the registration processing unit 402 acquires the item acquisition information. In this case, the registration processing unit 402 recognizes that item acquisition information with an attribute flag value of "0" is for an item that is not retained and makes an inquiry to the achievement-level management server 18 for the item acquisition information that is not retained in the hard disk drive 34*a*. In this case, since the respective sets of item acquisition information of the item IDs 1, 2, and 4 exist in the achievement-level management server 18, the registration processing unit 402 transmits a transmission request to the achievement-level management server 18 via the communication unit 404. The achievement-level management server 18 transmits the requested item acquisition information to the game device 10*a*, and the registration processing unit 402 acquires this item acquisition information. The acquired item acquisition information is written in a trophy acquisition table in the hard disk drive 34*a*.

As described above, the item acquisition information is synchronized among the plurality of game devices 10*a* and 10*b* and the achievement-level management server 18. As shown in FIG. 10, in the game device 10*a* in which a trial-version game program is executed, an attribute flag value of "0" and an attribute flag value of "1" are sometimes mixed in item acquisition information for which an acquisition flag value is set to be "1". An explanation is given of a process for displaying a trophy in accordance with an attribute flag value.

<Process for Displaying Trophies>

Upon receiving a request for displaying a trophy from the user, the item information providing unit 406 reads item information, which includes item setting information 60 and item acquisition information 70, from the hard disk drive 34 and provides the item information to the item information acquisition unit 210. The item setting information acquisition unit 212 acquires the item setting information 60, and the item acquisition information acquisition unit 214 acquires the item acquisition information 70.

The achievement-level deriving unit 220 calculates points using the item acquisition information 70 and the item setting information 60 and then derives the achievement level for the game based on the calculated points. Four types of trophies are prepared: a bronze trophy; a silver trophy; a gold trophy; and a platinum trophy. Points are set as follows for the types of trophies:

Bronze: 10 points
Silver: 30 points
Gold: 100 points
Platinum: 200 points

In the default item setting information 60, for example, the types and the numbers of trophies are allocated such that the total of the points for all the trophies become around 1000 points. This is to ensure that there will be no unfairness between games when deriving the level of a user, which is described later. A point setting table that describes the above relationship is stored in the hard disk drive 34, and the achievement-level deriving unit 220 acquires the point setting table via the item information providing unit 406.

The achievement-level deriving unit 220 extracts the number of trophies for each type that are included in the item setting information 60 and calculates the total points. For example, if there are twenty bronze trophies, ten silver trophies, three gold trophies, and one platinum trophy, the total points are 1000 (=20*10+10*30+3*100+1*200).

The achievement-level deriving unit 220 then extracts the number of acquired trophies for each type that are included in the item acquisition information 70 and calculates acquired points. The achievement-level deriving unit 220 separates the acquired trophies included in the item acquisition information 70 into trophies with an attribute flag value set to be "1" and trophies with an attribute flag value set to be "0" and calculates acquired points. For example, if there are sixteen bronze trophies, eight silver trophies, one gold trophy, and zero platinum trophy in the acquired trophies with an attribute flag value set to be "1", the acquired points are 500 (=16*10+ 8*30+1*100) points. If there is one gold trophy as an acquired trophy with an attribute flag value set to be "0", the acquired points are 100 (=1*100) points.

The achievement-level deriving unit 220 calculates the achievement level of the game as follows: (the acquired points in the product-version game program/the total points) *100

In this case, the achievement level is derived to be 50 percent (=100*500/1000). The achievement-level deriving unit 220 calculates the achievement level of the game in which acquired points in the trial-version game program are also taken into consideration. In this case, the achievement level is derived to be 60 percent (=50 percent+10 percent).

By deriving the achievement level of the game as follows: (the acquired points/the total points)*100, the achievement-level deriving unit 220 can derive the achievement level in which the difficulty of a mission is taken into consideration. For example, since the total points are not taken into consideration in the representation of the achievement level of the game by the acquired points, the achievement level cannot be properly represented by the acquired points. Since the difficulty is not taken into consideration in the representation of the achievement level of the game by the number of acquired trophies, the representation cannot be said to accurately represent the achievement level. As described, the achievement-level deriving unit 220 can derive the achievement level that is objective. The derived achievement level is transmitted to the achievement-level information displaying unit 234. The achievement-level information displaying unit 234 displays the derived achievement level on the display device 12.

If item setting information 60 and item acquisition information 70 for a plurality of games are stored in the hard disk drive 34, the achievement-level deriving unit 220 derives respective achievement levels for the plurality of games. The achievement-level information displaying unit 234 can display the respective achievement levels of the plurality of games on the display device 12.

Figure 11:
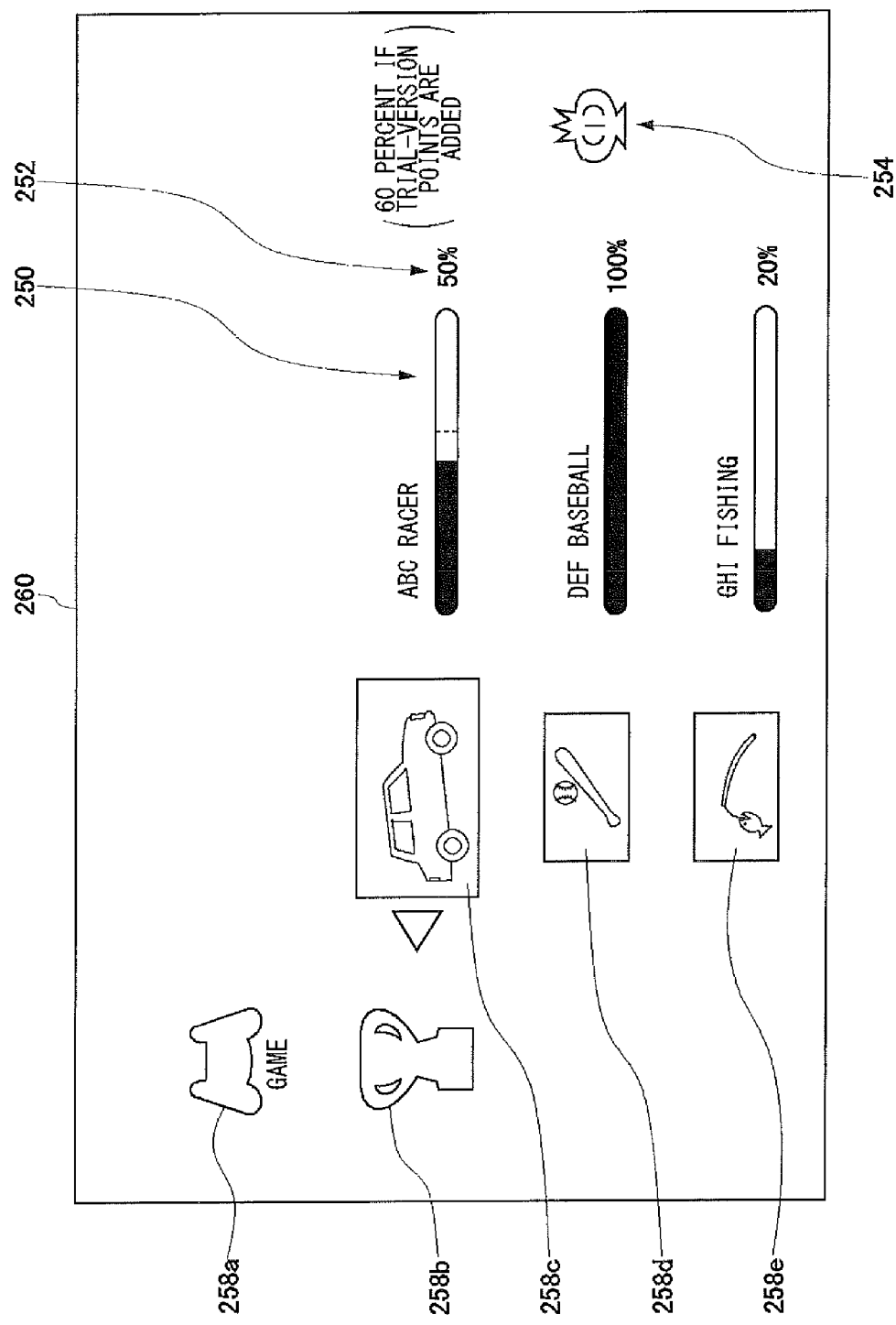
FIG. 11 is a diagram illustrating an example of a screen image that shows a game achievement level.

FIG. 11 illustrates an example of a screen image that shows a game achievement level. In an achievement-level display screen image 260, the achievement level of a game is represented by an achievement-level indicator 250 and an achievement-level value 252. The achievement-level display screen image 260 is generated by the display processing unit 230.

The icon image displaying unit 232 arranges icon images 258a through 258e in the achievement-level display screen image 260. The icon images 258a and 258b are images prepared by the system software 200, and the icon images 258c, 258d, and 258e are images extracted from the item setting information 60. An icon image 258 of a game played by the user in the past for which a trophy has been acquired is displayed in an area located below the level of the icon image 258b, i.e., in an area where the icon images 258c, 258d, and 258e are displayed. On the right sides of the icon images 258c, 258d, and 258e, respective game titles are displayed, and respective achievement-level indicators 250 are displayed under the game titles, respectively. On the further right sides of the achievement-level indicators 250, achievement-level values 252 are displayed, respectively. In the achievement-level display screen image 260, a game achievement level is displayed for each of the plurality of games by an achievement-level indicator 250 and an achievement-level value 252. Among all, the achievement level of "DEF baseball" is 100 percent, and a platinum trophy image 254 that indicates the acquisition of a platinum trophy is shown.

In this example, the achievement-level value 252 of "ABC racer" is displayed to be 50 percent, and there is a display stating "60 percent if trial-version points are added" on the side of the achievement-level value 252. In the achievement-level indicator 250, a half of the indicator, which represents 50 percent, is colored, and a dashed line is drawn at a position representing 60 percent. This indicates that an achievement level representing 50 percent has been acquired in product-version game software and that an achievement level representing 10 percent has been acquired in trial-version game software. By viewing this achievement level, the user can learn that the achievement level will immediately increase to 60 percent if the user purchases the "rights" file of the product-version "ABC racer" game software. By using such display, an incentive to purchase the product-version "rights" file can be increased.

Figure 12:
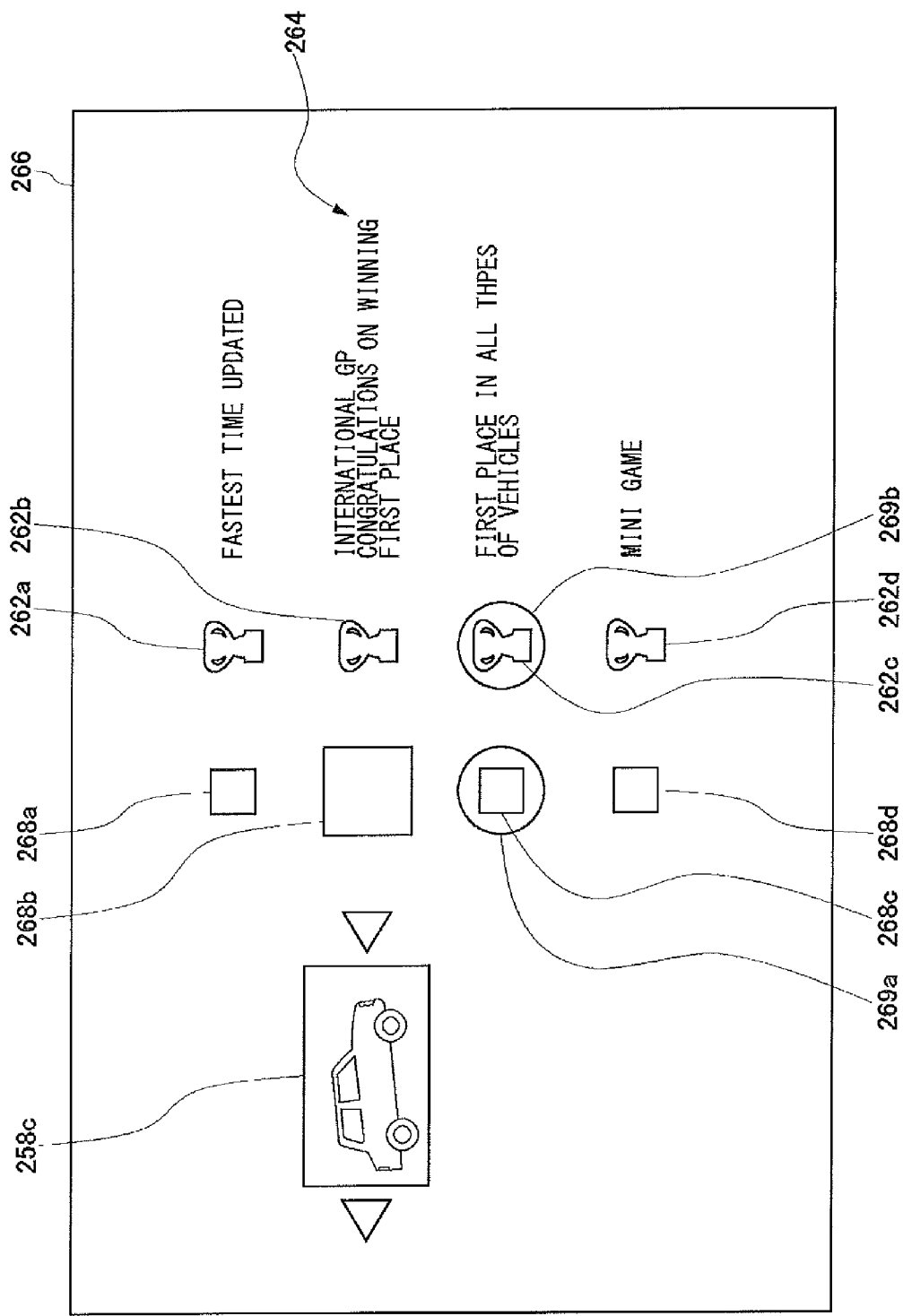
FIG. 12 is a diagram illustrating an example of a screen image that shows an acquired trophy.

FIG. 12 illustrates an example of a screen image that shows an acquired trophy. In the acquired-trophy display screen image 266, acquired trophies are represented by trophy images 268a through 268d and by trophy images 262a through 262d. The acquired-trophy display screen image 266 is generated by the display processing unit 230 when an instruction for displaying a detailed screen image is provided by the user to the icon image 258c shown in FIG. 11.

In the acquired-trophy displaying screen 266, the icon image displaying unit 232 arranges the icon image 258c, and the acquired item displaying unit 238 arranges the trophy images 268a through 268d and the trophy images 262a through 262d. The trophy images 268a through 268d are icon images extracted from the item setting information 60, and the trophy images 262a through 262d are images prepared by the system software 200. For example, the trophy images 262a through 262d are colored with any one of colors: bronze; silver; and gold. The acquired item displaying unit 238 extracts the item ID of a trophy acquired by the user from the item acquisition information 70, which is shown by the icon image 258c, of the game. The acquired item displaying unit 238 then acquires a trophy image 268 and explanation information 264 that are associated with the item ID in the item setting information 60 and arranges the trophy image 268 and the explanation information 264 on the right side of a corresponding trophy image 262 in the acquired-trophy displaying screen 266. This allows the user to learn which trophy the user has acquired so far, the type of the trophy, and the content of a mission that has been accomplished based on the information displayed in the acquired-trophy display screen image 266.

As described, the acquired item displaying unit 238 displays an acquired trophy image in the acquired-trophy display screen image 266 by using the item acquisition information 70. Marks 269a and 269b that indicate that respective trophies have been acquired in trial-version game software are added to the trophy image 268c and the trophy image 262c, respectively. This addition process is performed if an attribute flag value associated with an acquired trophy is "0". This allows for display in a mode different from display in a standard mode of trophy images 268 and 262 that have been acquired in product-version game software. The display mode needs to be different from that of a trophy image acquired in product-version game software. For example, a different color may be employed for display, and/or a color may be shaded off for display. Further, a completely different trophy image may be used. As described, a trophy image acquired in trial-version game software is displayed in a display mode different from that of a trophy image acquired in product-version game software. When the user views the acquired-trophy display screen image 266, the user develops a desire to complete acquired trophy images. Therefore, there is an advantage of increasing a motivation for purchasing a product-version "rights" file.

Figure 13:
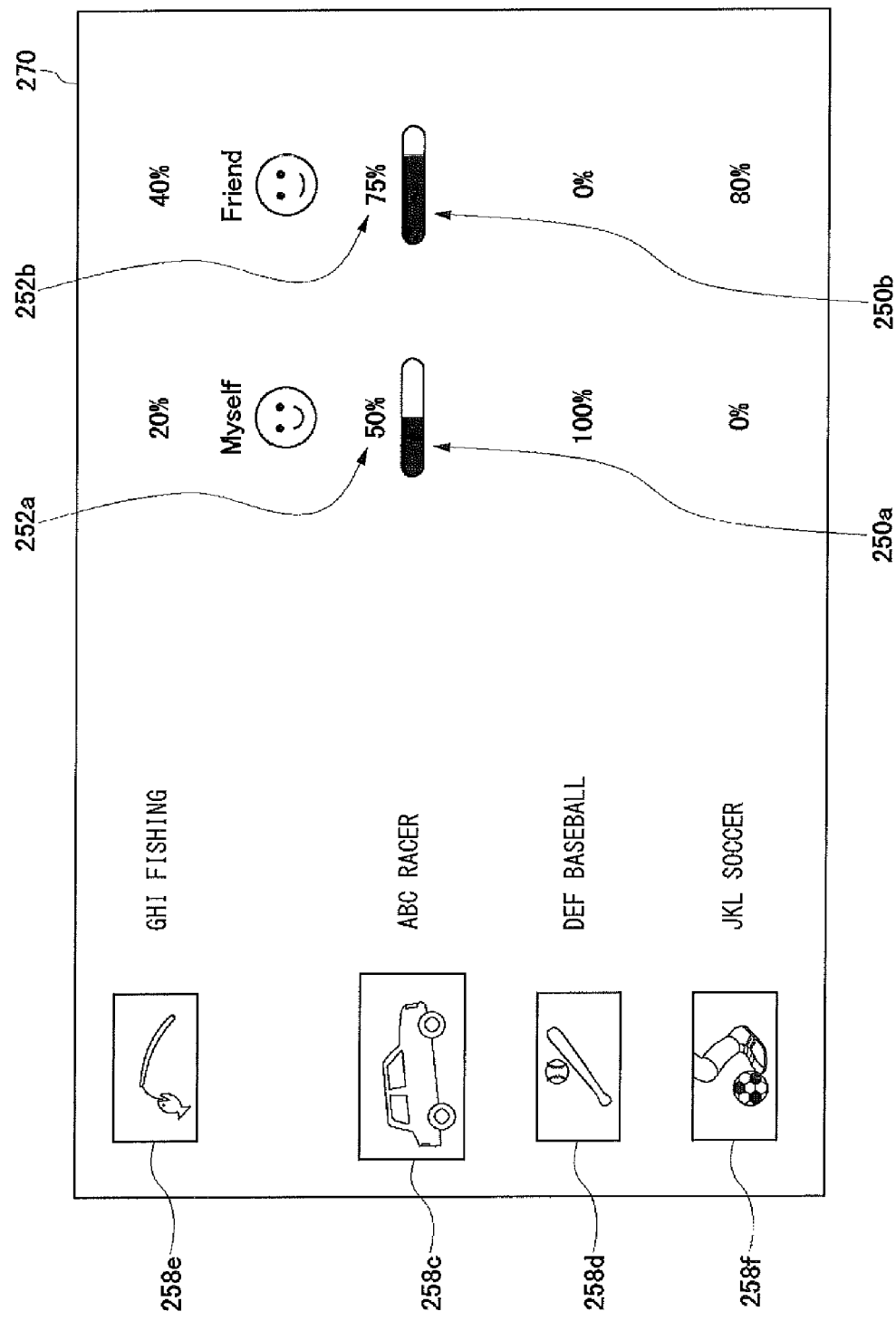
FIG. 13 is a diagram illustrating an example of a screen image that compares the achievement level of the user with the achievement level of another user.

FIG. 13 illustrates an example of a screen image that compares the achievement level of the user with the achievement level of another user. In an achievement-level comparing screen image 270, for a game for which an icon has been acquired by at least either the user or another user, the achievement-level deriving unit 220 derives an achievement level from item acquisition information 70 acquired by executing product-version game software, and the display processing unit 230 generates the achievement-level comparing screen image 270. In the achievement-level display screen image 260 shown in FIG. 11, a total achievement level is temporarily presented to the user by also using a trophy acquired by executing trial-version game software. In the achievement-level comparing screen image 270, only a trophy acquired in a product-version game is to be compared for an achievement level in order to ensure fairness to users who have purchased a product-version game.

The registration processing unit 402 acquires item acquisition information 70 of another specific user from the achievement-level management server 18 via the communication unit 404 and stores the item acquisition information 70 in the hard disk drive 34. The other specific user is a user for whom a network account ID is recorded in the game device 10. This allows the registration processing unit 402 to notify the achievement-level management server 18 of the account ID of the other user and to acquire the item acquisition information 70. If the item acquisition information 70 of the other user includes information on a game the game device 10 does not have at this time, the registration processing unit 402 also acquires the item setting information 60 on the game from the achievement-level management server 18. The item acquisition information 70 of the other user does not include any acquisition information on a trophy acquired in a trial-version game.

The item information acquisition unit 210 acquires the item setting information 60 and the item acquisition information 70 that have been acquired from the achievement-level management server 18 and provides the item setting information 60 and the item acquisition information 70 to the achievement-level deriving unit 220. The achievement-level deriving unit 220 derives respective achievement levels of a game for the user and another user. For a game that has never been played, the achievement level is set to "0". The achievement-level information displaying unit 234 displays the respective achievement levels of the user and the other user side-by-side in the achievement-level comparing screen image 270. In the achievement-level comparing screen image 270, respective achievement-level indicators 205*a* and 250*b* for the user and the other user are displayed for an icon image 258*c* arranged in a focus area. Further, game titles are displayed for respective icon images 258, and respective achievement-level values 252 for the user and for the other user are displayed.

In the achievement-level comparing screen image 270 shown in FIG. 13, the achievement level is displayed as 0 percent since the user has never played "JKL soccer" or has not acquired any items. As described, even for a game for which the user has not acquired any items, the user can learn how much the other user has played the game by displaying the achievement-level value 252 of the other user.

Figure 14:
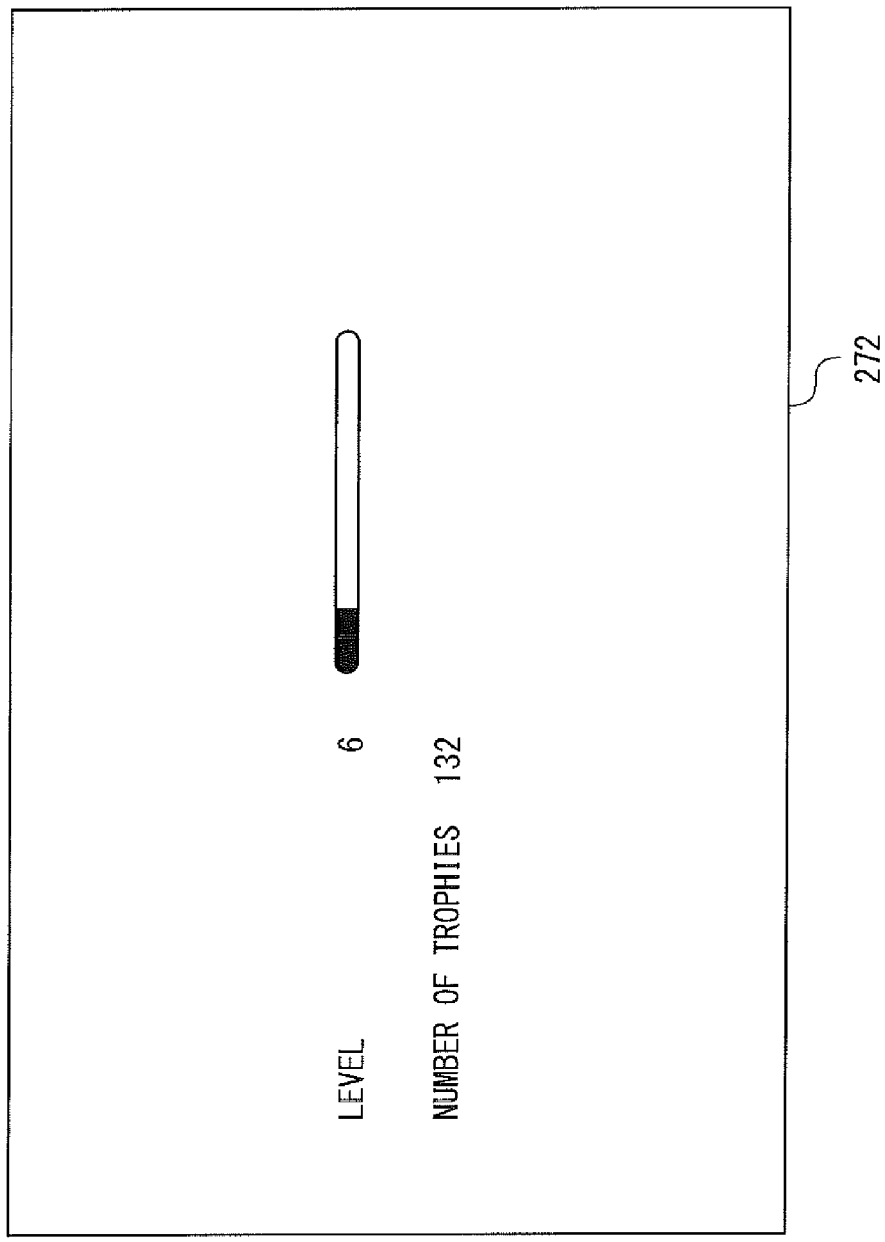
FIG. 14 is a diagram illustrating an example of a screen image that shows the level of a user.

FIG. 14 illustrates an example of a screen image that shows the level of a user. A level displaying screen image 272 shows the level of the user and the number of trophies that have been acquired by the user so far are displayed in order to check the user's own level among all the users registered in the information processing system 1. An indicator shown in FIG. 14 represents the percentage of acquired points at the current level, where the number of points required to reach the next level represent 100 percent.

The level deriving unit 222 calculates points by using item acquisition information 70 and the item setting information 60 for all the games stored in the hard disk drive 34. The level deriving unit 222 derives the level of the user based on the calculated points. The level deriving unit 222 does not use trophies acquired in trial-version game software to calculate the points. The level deriving unit 222 uses only trophies acquired in product-version game software to calculate the points. This distinction is made based on an attribute flag value in a trophy acquisition table. A process of calculating points for one game is as explained in association with the achievement-level deriving unit 220. By performing this calculating process for all the games and by tallying up respective points, the number of points acquired for all the games can be derived.

The level of the user increases sequentially starting from "level 1" as the number of acquired points increases. For example, in the case where 100 points are set to be a unit for one level, if the number of acquired points is 620, the level deriving unit 222 derives that the level is six and that the achievement level at level 6 is 20 percent. The level deriving unit 222 transmits a result of the derivation to the level information displaying unit 236. The level information displaying unit 236 then displays "6" as the value of the level and displays the achievement level of "20 percent" using an indicator in the level displaying screen image 272.

In this process, the level of the user shown in the level displaying screen image 272 shown in FIG. 14 is derived by the level deriving unit 222 in the system software 200. The function of the level deriving unit 222 may be realized by the controller 500 of the achievement-level management server 18. The achievement-level management server 18 retains the latest item acquisition information 70 by performing synchronization with a game device 10. Thus, the controller 500 can derive the level of each user and the number of trophies acquired by each user so far. Therefore, the controller 500 calculates points by using the item acquisition information 70 for a game for each user stored in the memory device 80 and by using the item setting information 60 for a game for which each user has acquired a trophy and derives the latest level of each user. By having a level deriving function, the achievement-level management server 18 can perform a statistical process such as, e.g., generating distribution of users in each level. Thus, there is an advantage that each user can easily learn his/her relative level.

As shown in FIG. 3, item acquisition information 70*a* is transmitted to the achievement-level management server 18, and item acquisition information 70*b* is transmitted to the game device 10 so that item acquisition information 70*a* and item acquisition information 70*b* are synchronized between the game device 10 and the achievement-level management server 18. As described previously, the level of a user serves as an indicator for evaluating the total game technique of the user. Therefore, only trophies acquired when product-version game software is executed are used for evaluation also in the achievement-level management server 18. Therefore, when the game device 10 transmits the item acquisition information 70*a* to the achievement-level management server 18, the game device 10 excludes acquisition information with an attribute flag value of "0" and transmits only acquisition information with an attribute flag value of "1". With this, a situation can be prevented where trophies acquired in trial-version game software are used for the calculation of the level of a user in the achievement-level management server 18.

The game device 10 may transmit a trophy acquisition table including an attribute flag value to the achievement-level management server 18, and the achievement-level management server 18 may excludes trophies with an attribute flag value of "0" so as to derive the level of the user.

Figure 15:
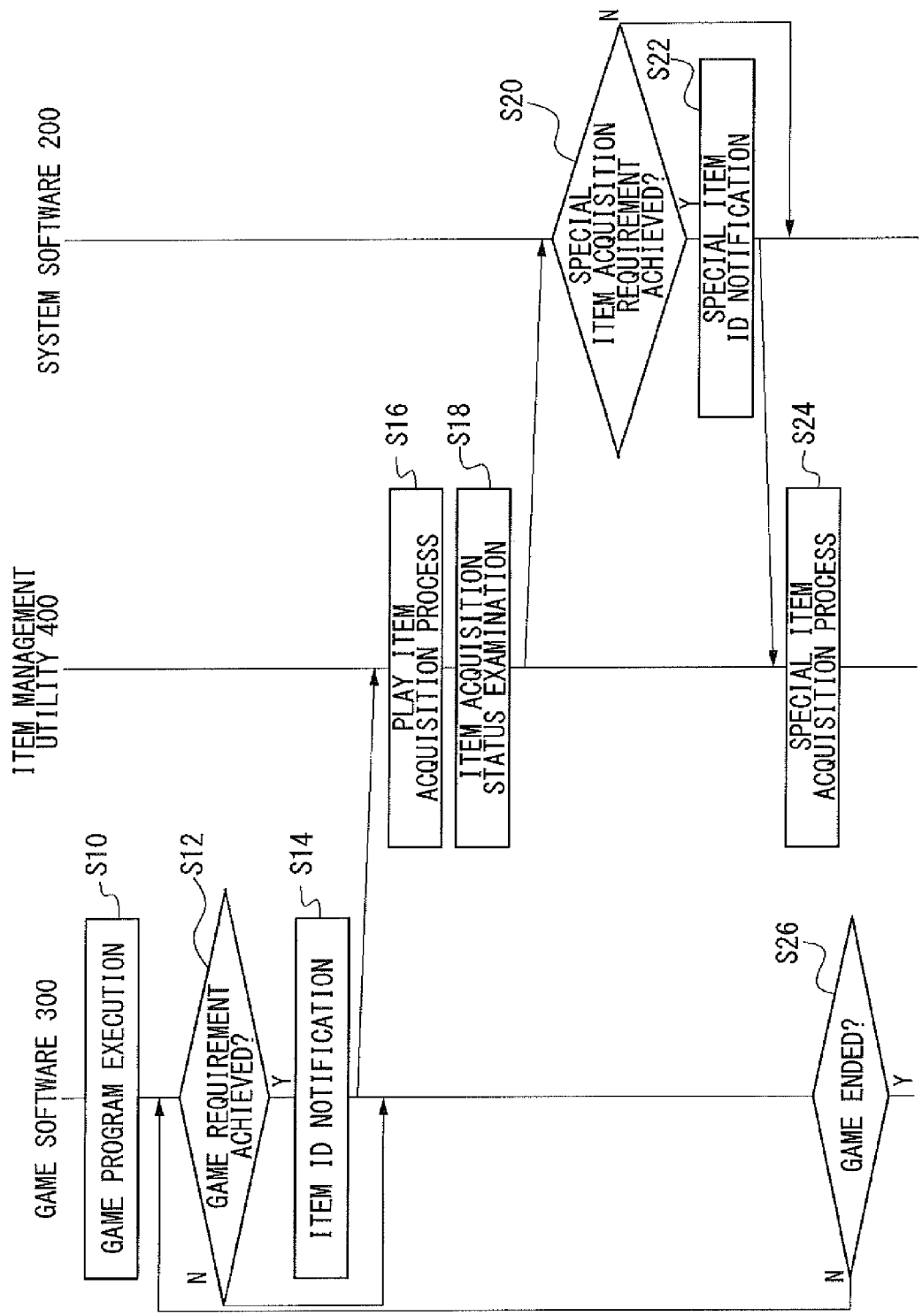
FIG. 15 is a diagram illustrating a flowchart of a process of acquiring an item.

FIG. 15 illustrates a flowchart of a process of acquiring an item. A flowchart shown in FIG. 15 displays the processing procedure of components by a combination of a letter "S" (the initial of the word "Step"), which represents a step, and a number. When some sort of a determination process is performed by a process displayed by the combination of a letter "S" and a number, the processing sequence is displayed while adding a letter "Y" (the initial of the word "Yes") when the determination result is positive (e.g., Y in S10) and is displayed while adding a letter "N" (the initial of the word "No") when the determination result is negative (e.g., N in S10). The meaning of the display in the flowchart is the same as that in a flowchart shown in another figure.

Upon the receipt of operation input entered into the game controller 40 by the user, the application execution unit 302 executes the game program in the game software 300 (S10). The requirement achievement detection unit 304 detects, based on the status of the progress of the game, whether a play requirement of the game set in advance in the game has been met (S12). If the requirement achievement detection unit 304 detects that a mission has been achieved (Y in S12), the requirement achievement detection unit 304 acquires an item ID that is hard-coded for the requirement. The satisfaction of the play requirement may be detected upon the acquisition of the item ID. The item ID notification unit 306 notifies the item management utility 400 of the acquired item ID (S14). The notification of the item ID is not made if the play requirement for the game is not met (N in S12).

In the item management utility 400, the item ID acquisition unit 420 acquires the item ID as notified and passes the item ID to the play item acquisition processing unit 422. The play item acquisition processing unit 422 generates the item acquisition information 70 by using the item ID and execution information stored in the execution information storing unit 430 and executes a process of acquiring an item (S16). The item acquisition status examination unit 414 refers to the item setting information 60 and the item acquisition information 70 so as to examine the acquisition status of items and then notifies the special-item acquisition requirement achievement determining unit 202 in the system software 200 of the acquisition status (S18).

Based on an examination result from the item acquisition status examination unit 414, the special-item acquisition requirement achievement determining unit 202 determines whether or not an item acquisition requirement for acquiring a special item has been met (S20). More specifically, if there is an item whose platinum flag value is "1" that has not been acquired, the special-item acquisition requirement achievement determining unit 202 determines that the item acquisition requirement is not met (N in S20). On the other hand, if all the items whose platinum flag values are "1" have been acquired, the special-item acquisition requirement achievement determining unit 202 determines that the item acquisition requirement has been met (Y in S20). In this case, the special-item acquisition requirement achievement determining unit 202 refers to the respective attribute flag values of acquired items. If there is even one attribute flag value of "0", the special-item acquisition requirement achievement determining unit 202 sets the attribute flag value of a special item to be "0". If the respective attribute flag values of all the items are "1", the attribute flag value of the special item to be "1". The special-item acquisition requirement achievement determining unit 202 notifies the item management utility 400 of the item ID and the attribute flag value of the special item (S22), and the special item acquisition processing unit 412 generates the item acquisition information 70 by using the item ID and the attribute flag value (S24). This process of acquiring an item is performed until the game ends (N in S26). When the game ends (Y in S26), the process of acquiring an item ends.

Figure 16:
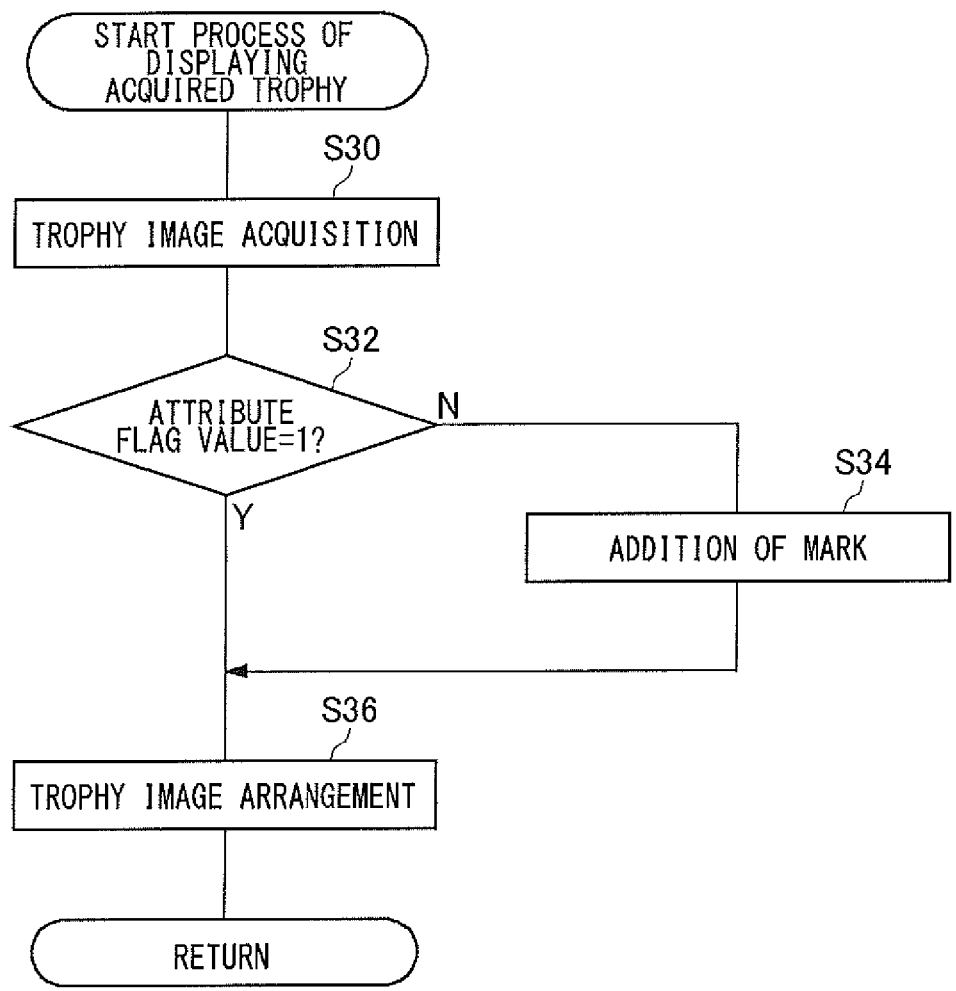
FIG. 16 is a diagram illustrating a flowchart for generating an acquired-trophy display screen image.

FIG. 16 illustrates a flowchart for generating an acquired-trophy display screen image. If the acquired item displaying unit 238 acquires a trophy image that represents an acquired trophy (S30), the acquired item displaying unit 238 refers to the attribute flag value of the trophy (S32). If the attribute flag value is "1" (Y in S32), the acquired item displaying unit 238 arranges the trophy image at a predetermined position in the screen. On the other hand, if the attribute flag value is "0" (N in S32), the acquired item displaying unit 238 adds a mark to the trophy image (S34) and arranges the trophy image at a predetermined position in the screen along with the mark (S36). The acquired item displaying unit 238 performs the processes in S30-S36 on all trophies to be displayed.

Described above is an explanation based on the exemplary embodiments of the present invention. These exemplary embodiments are intended to be illustrative only, and it will be obvious to those skilled in the art that various modifications to constituting elements and processes could be developed and that such modifications are also within the scope of the present invention.

As described in the exemplary embodiment, the execution information storing unit 430 stores execution information specifying whether an application program being executed is a product-version application program, a trial-version application program, or a rental-version application program. In a case where the application program is being executed using save data, the execution information storing unit 430 may store information specifying whether the save data belongs to the user himself/herself or the save data belongs to another user. In this case, the play item acquisition processing unit 422 generates, as attribute information, a trophy acquisition table including a second attribute flag value that specifies whether or not the save data belongs to the user. If the save data belongs to the user, the second attribute flag value is set to be "1". If the save data does not belong to the user, the second attribute flag value is set to be "0". A process of synchronizing the item acquisition information may be performed when the attribute flag value explained in the exemplary embodiment and the second attribute flag value are both "1". Similarly, the item image may be displayed in a standard mode when the attribute flag value explained in the exemplary embodiment and the second attribute flag value are both "1".

In the exemplary embodiment, if game software is changed from trial-version game software to product-version game software during game play, the play item acquisition processing unit 422 refers to execution information stored in the execution information storing unit 430 and changes an attribute flag value of "0" to an attribute flag value of "1" in a trophy acquisition table so as to change trophies acquired in the trial-version game software to trophies acquired in the product-version game software. For example, if the user purchases a product-version memory medium 50 and inserts the memory medium 50 into the media drive 32, the execution information storing unit 430 may acquire from the memory medium 50 execution information specifying that the game software is product-version game software and store the execution information, and the play item acquisition processing unit 422 may refer to the execution information before game play and change an attribute flag value of "0" in a trophy acquisition table to an attribute flag value of "1". In this case, the execution information stored in the execution information storing unit 430 shows that a game program can be executed under a predetermined environment, and the play item acquisition processing unit 422 can change an attribute flag value of "0" in a trophy acquisition table to an attribute flag value of "1" based on such execution information.

What is claimed is:

1. An information processing apparatus comprising:
   a storing unit configured to store execution information on an application program;
   a first item acquisition processing unit configured to generate, when a requirement is met that was set in advance in an application, item acquisition information using an item ID associated with the met requirement; and
   a memory device configured to store the generated item acquisition information,
   wherein the first item acquisition processing unit determines attribute information on an acquired item based on the execution information stored in the storing unit and generates item acquisition information that maps an item ID to the determined attribute information.

2. The information processing apparatus according to claim 1, wherein every time a requirement is met in the application, the first item acquisition processing unit determines the attribute information on the acquired item in reference to the execution information stored in the storing unit and generates the item acquisition information.

3. The information processing apparatus according to claim 1, further comprising:
   an acquired item displaying unit configured to display an image of the acquired item on a screen using the item acquisition information,
   wherein the attribute information is information determining whether to display an item image in a standard mode or to display the item image in a mode different from the standard mode, and
   wherein the acquired item displaying unit determines the display mode of the item image in accordance with the attribute information.

4. The information processing apparatus according to claim 1, wherein the attribute information is information determining whether or not to synchronize the item acquisition information with that of another information processing apparatus.

5. The information processing apparatus according to claim 1, wherein the attribute information is information indicating whether or not the acquired item was acquired at the time when the application program was being executed under a predetermined environment.

6. The information processing apparatus according to claim 5, wherein if the execution information stored in the storing unit indicates that the application program is being executed under the predetermined environment or the application program can be executed under the predetermined environment, the first item acquisition processing unit changes information that is included in the item acquisition information already generated, and that indicates that the item was acquired during the execution of the application program under an environment different from the predetermined environment to information that indicates that the item was acquired during the execution of the application program under the predetermined environment.

7. The information processing apparatus according to claim 5, comprising:
   an item acquisition status examination unit configured to examine the status of item acquisition;
   an item acquisition requirement achievement determining unit configured to determine, based on an examination result from the item acquisition status examination unit, whether or not an item acquisition requirement for acquiring a special item has been met; and
   a second item acquisition processing unit configured to generate, when the acquisition requirement for acquiring the special item is met, item acquisition information using an item ID associated with the special item,
   wherein the second item acquisition processing unit generates, when the item acquisition requirement for acquiring the special item is to acquire a plurality of items and when at least one of attribute information sets respectively associated with the plurality of acquired items indicates a corresponding item was acquired when the application program was being executed under an environment different from the predetermined environment, item acquisition information that maps the item ID associated with the special item to the attribute information indicating that the corresponding item was acquired when the application program was being executed under the environment different from the predetermined environment.

8. An information processing apparatus comprising:
   an item acquisition processing unit configured to generate, when a requirement is met that was set in advance in an application, item acquisition information using an item ID associated with the met requirement;
   a memory device configured to store the generated item acquisition information; and
   an acquired item displaying unit configured to display an image of the acquired item on a screen using the item acquisition information,
   wherein the acquired item displaying unit displays an image of an item acquired when an application program was being executed under a predetermined environment in a mode different from that of an image of an item acquired when the application program was being executed under an environment different from the predetermined environment.

9. The information processing apparatus according to claim 8, wherein the item acquisition processing unit generates item acquisition information that maps, to the item ID, attribute information determining whether to display an item image in a standard mode or to display the item image in a mode different from the standard mode.

10. The information processing apparatus according to claim 1, further comprising:
    an application execution unit configured to execute the application program; and
    an item ID notification unit configured to convey an item ID associated with a requirement met in the application.

11. A computer program embedded on a non-transitory computer-readable recording medium, comprising:
    a module configured to store execution information on an application program;

a module configured to generate, when a requirement is met that was set in advance in an application, item acquisition information using an item ID associated with the met requirement; and a module configured to store the generated item acquisition information in a memory device, wherein the module configured to generate the item acquisition information includes a module for determining attribute information on an acquired item based on the stored execution information and for generating item acquisition information that maps an item ID to the determined attribute information.

12. A computer program embedded on a non-transitory computer-readable recording medium, comprising:

a module configured to generate, when a requirement is met that was set in advance in an application, item acquisition information using an item ID associated with the met requirement;

a module configured to store the generated item acquisition information in a memory device; and a module configured to display an image of an acquired item on a screen using the item acquisition information, wherein the module configured to display an image of an acquired item includes a module for displaying an image of an item acquired when an application program was being executed under a predetermined environment in a mode different from that of an image of an item acquired when the application program was being executed under an environment different from the predetermined environment.

13. A non-transitory computer-readable recording medium having embodied thereon the program according to claim 11.

14. An information processing system where an information processing apparatus and a server are connected such that the information processing apparatus and the server can communicate through a network, wherein the information processing apparatus comprises:

a storing unit configured to store execution information on an application program;

a first memory device configured to store item acquisition information on an acquired item based on the execution information stored in the storing unit, where the item acquisition information maps, to attribute information, an item ID for identifying an item acquired during the execution of an application program and when a requirement is met that was set in advance in the application program, wherein the server comprises:

a second memory device configured to store, along with information identifying the user, item acquisition information including an item ID for identifying an item acquired by the user, and wherein the information processing apparatus determines whether or not to transmit the item acquisition information to the server based on the attribute information.

15. The information processing system according to claim 14, wherein the attribute information is information determining whether or not to synchronize the item acquisition information with that of the server, and wherein the information processing apparatus transmits, to the server, item acquisition information associated with attribute information determining to perform synchronization but does not transmit, to the server, item acquisition information associated with attribute information determining not to perform synchronization.

16. The information processing system according to claim 14, wherein the server transmits, to the information processing apparatus, the item acquisition information including an item ID, which is not stored in the first memory device, and wherein the information processing apparatus stores received item acquisition information in the first memory device.

17. An information processing apparatus comprising:

a storing unit configured to store execution information on an application program;

an item acquisition processing unit configured to generate, when a requirement is met that was set in advance in an application, item acquisition information using an item ID associated with the met requirement;

a memory device configured to store the generated item acquisition information; and a communication unit configured to transmit the item acquisition information stored in the memory device, wherein the item acquisition processing unit: (i) determines attribute information on an acquired item based on the execution information stored in the storing unit, and (ii) generates item acquisition information that maps, to the item ID, further attribute information determining whether or not to synchronize the item acquisition information stored in the memory device with that of another information processing apparatus, and wherein the communication unit transmits item acquisition information including further attribute information determining to perform synchronization but does not transmit item acquisition information including further attribute information determining not to perform synchronization.

18. A computer program embedded on a non-transitory computer-readable recording medium, comprising:

a module configured to store execution information on an application program;

a module configured to generate, when a requirement is met that was set in advance in an application, item acquisition information using an item ID associated with the met requirement;

a module configured to store the generated item acquisition information in a memory device; and a module configured to transmit the item acquisition information stored in the memory device, wherein the module configured to generate the item acquisition information includes a module for: (i) determining attribute information on an acquired item based on the execution information stored in the storing unit, and (ii) generating item acquisition information that maps, to the item ID, further attribute information determining whether or not to synchronize the item acquisition information stored in the memory device with that of another information processing apparatus, and wherein the module configured to transmit item acquisition information includes a module for transmitting item acquisition information including further attribute information determining to perform synchronization but does not transmit item acquisition information including further attribute information determining not to perform synchronization.

19. A non-transitory computer-readable recording medium having embodied thereon the program according to claim 18.

* * * * *